(12) United States Patent
Liu et al.

(10) Patent No.: US 8,848,294 B2
(45) Date of Patent: Sep. 30, 2014

(54) METHOD AND STRUCTURE CAPABLE OF CHANGING COLOR SATURATION

(75) Inventors: Jian Liu, San Jose, CA (US); Kostadin Djordjev, San Jose, CA (US); Marc Maurice Mignard, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 329 days.

(21) Appl. No.: 12/910,694

(22) Filed: Oct. 22, 2010

(65) Prior Publication Data

US 2011/0286072 A1    Nov. 24, 2011

Related U.S. Application Data

(60) Provisional application No. 61/346,846, filed on May 20, 2010.

(51) Int. Cl.
  *G02B 1/10* (2006.01)
  *G02B 26/00* (2006.01)

(52) U.S. Cl.
  CPC .................................. *G02B 26/001* (2013.01)
  USPC ......................................................... 359/586

(58) Field of Classification Search
  CPC .............. G02B 26/001; G02B 26/007; G02B 26/0833; G02B 26/085; G02B 5/0825
  USPC ........ 359/223.1, 224.1, 224.2, 291, 292, 295, 359/584–586; 348/771, 772
  See application file for complete search history.

(56) References Cited

U.S. PATENT DOCUMENTS

| | | | |
|---|---|---|---|
| 2,518,647 | A | 8/1950 | Teeple |
| 2,534,846 | A | 12/1950 | Jack et al. |
| 2,590,906 | A | 4/1952 | Tripp |
| 2,677,714 | A | 5/1954 | Max |

(Continued)

FOREIGN PATENT DOCUMENTS

| | | |
|---|---|---|
| CA | 2490975 A1 | 1/2004 |
| CN | 1158182 A | 8/1997 |

(Continued)

OTHER PUBLICATIONS

Optical Constants of AlAs (Aluminum Arsenide), RefractiveIndex.INFO—Refractive Index Database http://refractiveindex.info/?group=CRYSTALS&material=AlAs at least as of Jul. 6, 2011.

(Continued)

*Primary Examiner* — Joseph P Martinez
(74) *Attorney, Agent, or Firm* — Knobbe, Martens, Olson & Bear LLP

(57) ABSTRACT

Various embodiments include an interferometric modulator device configured to provide improved saturation. In some embodiments, saturation is improved by optically matching the impedance of two materials with different refractive indices using a multilayer having a refractive index gradient. In various embodiments, the thickness one or more of the layers in the multilayer are selected to provide increased saturation. Accordingly, in various embodiments the multilayer having a refractive index gradient helps to narrow the resonance of a pixel such that the band of wavelengths that are reflected from the pixel is smaller. In turn, a device including a combination of red, green and blue pixels may expand the spectrum of colors that are reflected by the device in operation. Additionally, there may be better contrast between whites and blacks, as darker blacks with less hue are produced.

44 Claims, 10 Drawing Sheets

(56) References Cited

U.S. PATENT DOCUMENTS

| | | |
|---|---|---|
| 3,247,392 A | 4/1966 | Thelen |
| 3,439,973 A | 4/1969 | Paul et al. |
| 3,443,854 A | 5/1969 | Weiss |
| 3,448,334 A | 6/1969 | Frost |
| 3,653,741 A | 4/1972 | Marks |
| 3,656,836 A | 4/1972 | De Cremoux et al. |
| 3,679,313 A | 7/1972 | Rosenberg |
| 3,725,868 A | 4/1973 | Malmer, Jr. et al. |
| 3,728,030 A | 4/1973 | Hawes |
| 3,813,265 A | 5/1974 | Marks |
| 3,886,310 A | 5/1975 | Guldberg et al. |
| 3,924,929 A | 12/1975 | Holmen et al. |
| 3,955,190 A | 5/1976 | Teraishi |
| 3,955,880 A | 5/1976 | Lierke |
| 3,990,784 A | 11/1976 | Gelber |
| 4,099,854 A | 7/1978 | Decker et al. |
| 4,196,396 A | 4/1980 | Smith |
| 4,200,472 A | 4/1980 | Chappell et al. |
| 4,287,449 A | 9/1981 | Takeda et al. |
| 4,377,324 A | 3/1983 | Durand et al. |
| 4,389,096 A | 6/1983 | Hori et al. |
| 4,400,577 A | 8/1983 | Spear |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,633,031 A | 12/1986 | Todorof |
| 4,790,635 A | 12/1988 | Apsley |
| 4,832,459 A | 5/1989 | Harper et al. |
| 4,859,060 A | 8/1989 | Katagiri et al. |
| 4,878,741 A | 11/1989 | Fergason |
| 4,915,479 A | 4/1990 | Clarke |
| 4,918,577 A | 4/1990 | Furudate |
| 4,929,061 A | 5/1990 | Tominaga et al. |
| 4,947,291 A | 8/1990 | McDermott |
| 4,961,617 A | 10/1990 | Shahidi et al. |
| 4,980,775 A | 12/1990 | Brody |
| 4,982,184 A | 1/1991 | Kirkwood |
| 5,022,745 A | 6/1991 | Zayhowski et al. |
| 5,044,736 A | 9/1991 | Jaskie et al. |
| 5,136,669 A | 8/1992 | Gerdt |
| 5,142,414 A | 8/1992 | Koehler |
| 5,151,801 A | 9/1992 | Hiroshima |
| 5,164,858 A | 11/1992 | Aguilera, Jr. et al. |
| 5,168,406 A | 12/1992 | Nelson |
| 5,192,946 A | 3/1993 | Thompson et al. |
| 5,221,982 A | 6/1993 | Faris |
| 5,228,013 A | 7/1993 | Bik |
| 5,233,385 A | 8/1993 | Sampsell |
| 5,287,215 A | 2/1994 | Warde et al. |
| 5,293,272 A | 3/1994 | Jannson et al. |
| 5,311,360 A | 5/1994 | Bloom et al. |
| 5,326,426 A | 7/1994 | Tam et al. |
| 5,327,263 A | 7/1994 | Katagiri et al. |
| 5,345,322 A | 9/1994 | Fergason |
| 5,356,488 A | 10/1994 | Hezel |
| 5,361,190 A | 11/1994 | Roberts et al. |
| 5,365,283 A | 11/1994 | Doherty et al. |
| 5,398,170 A | 3/1995 | Lee |
| 5,401,983 A | 3/1995 | Jokerst et al. |
| 5,448,314 A | 9/1995 | Heimbuch et al. |
| 5,452,024 A | 9/1995 | Sampsell |
| 5,452,385 A | 9/1995 | Izumi et al. |
| 5,467,216 A | 11/1995 | Shigeta et al. |
| 5,474,865 A | 12/1995 | Vasudev |
| 5,517,347 A | 5/1996 | Sampsell |
| 5,550,373 A | 8/1996 | Cole et al. |
| 5,589,852 A | 12/1996 | Thompson et al. |
| 5,604,607 A | 2/1997 | Mirzaoff |
| 5,606,441 A | 2/1997 | Florence et al. |
| 5,615,024 A | 3/1997 | May et al. |
| 5,619,059 A | 4/1997 | Li et al. |
| 5,619,365 A | 4/1997 | Rhoads et al. |
| 5,619,366 A | 4/1997 | Rhoads et al. |
| 5,633,739 A | 5/1997 | Matsuyama et al. |
| 5,636,185 A | 6/1997 | Brewer et al. |
| 5,638,084 A | 6/1997 | Kalt |
| 5,654,819 A | 8/1997 | Goossen |
| 5,671,314 A | 9/1997 | Gregory et al. |
| 5,710,656 A | 1/1998 | Goossen |
| 5,731,857 A | 3/1998 | Neijzen |
| 5,737,115 A | 4/1998 | Mackinlay et al. |
| 5,739,945 A | 4/1998 | Tayebati |
| 5,745,281 A | 4/1998 | Yi et al. |
| 5,751,492 A | 5/1998 | Meyers |
| 5,754,260 A | 5/1998 | Ooi et al. |
| 5,757,447 A | 5/1998 | Kobayashi et al. |
| 5,771,321 A | 6/1998 | Stern |
| 5,782,995 A | 7/1998 | Nanya et al. |
| 5,805,117 A | 9/1998 | Mazurek et al. |
| 5,815,229 A | 9/1998 | Shapiro |
| 5,818,095 A | 10/1998 | Sampsell |
| 5,835,255 A | 11/1998 | Miles |
| 5,835,256 A | 11/1998 | Huibers |
| 5,853,310 A | 12/1998 | Nishimura |
| 5,868,480 A | 2/1999 | Zeinali |
| 5,886,688 A | 3/1999 | Fifield et al. |
| 5,892,598 A | 4/1999 | Asakawa et al. |
| 5,914,804 A | 6/1999 | Goossen |
| 5,920,417 A | 7/1999 | Johnson |
| 5,933,183 A | 8/1999 | Enomoto et al. |
| 5,959,763 A | 9/1999 | Bozler et al. |
| 5,986,796 A | 11/1999 | Miles |
| 5,991,073 A | 11/1999 | Woodgate et al. |
| 5,999,239 A | 12/1999 | Larson |
| 6,002,829 A | 12/1999 | Winston et al. |
| 6,023,373 A | 2/2000 | Inoguchi et al. |
| 6,028,690 A | 2/2000 | Carter et al. |
| 6,031,653 A | 2/2000 | Wang |
| 6,040,937 A | 3/2000 | Miles |
| 6,046,840 A | 4/2000 | Huibers |
| 6,055,090 A | 4/2000 | Miles |
| 6,057,878 A | 5/2000 | Ogiwara et al. |
| 6,088,102 A | 7/2000 | Manhart |
| 6,094,285 A | 7/2000 | Wickham et al. |
| 6,113,239 A | 9/2000 | Sampsell et al. |
| 6,137,904 A | 10/2000 | Lubin et al. |
| 6,147,728 A | 11/2000 | Okumura et al. |
| 6,195,196 B1 | 2/2001 | Kimura et al. |
| 6,201,633 B1 | 3/2001 | Peeters et al. |
| 6,213,615 B1 | 4/2001 | Siitari |
| 6,229,916 B1 | 5/2001 | Ohkubo |
| 6,243,149 B1 | 6/2001 | Swanson et al. |
| 6,259,082 B1 | 7/2001 | Fujimoto et al. |
| 6,278,135 B1 | 8/2001 | Srivastava et al. |
| 6,282,010 B1 | 8/2001 | Sulzbach et al. |
| 6,285,424 B1 | 9/2001 | Yoshida |
| 6,288,824 B1 | 9/2001 | Kastalsky |
| 6,300,558 B1 | 10/2001 | Takamoto et al. |
| 6,301,000 B1 | 10/2001 | Johnson |
| 6,322,901 B1 | 11/2001 | Bawendi et al. |
| 6,323,834 B1 | 11/2001 | Colgan et al. |
| 6,323,923 B1 | 11/2001 | Hoshino et al. |
| 6,342,970 B1 | 1/2002 | Sperger et al. |
| 6,356,378 B1 | 3/2002 | Huibers |
| 6,377,233 B2 | 4/2002 | Colgan et al. |
| 6,381,022 B1 | 4/2002 | Zavracky |
| 6,399,257 B1 | 6/2002 | Shirota et al. |
| 6,400,738 B1 | 6/2002 | Tucker |
| 6,402,325 B1 | 6/2002 | Yamamoto |
| 6,411,423 B2 | 6/2002 | Ham |
| 6,412,969 B1 | 7/2002 | Torihara et al. |
| 6,421,054 B1 | 7/2002 | Hill et al. |
| 6,421,103 B2 | 7/2002 | Yamaguchi |
| 6,442,124 B1 | 8/2002 | Chung et al. |
| 6,448,709 B1 | 9/2002 | Chuang et al. |
| 6,456,279 B1 | 9/2002 | Kubo et al. |
| 6,466,354 B1 | 10/2002 | Gudeman |
| 6,466,358 B2 | 10/2002 | Tew |
| 6,480,634 B1 | 11/2002 | Corrigan |
| 6,483,613 B1 | 11/2002 | Woodgate et al. |
| 6,518,944 B1 | 2/2003 | Doane et al. |
| 6,519,073 B1 | 2/2003 | Goossen |
| 6,520,643 B1 | 2/2003 | Holman et al. |

(56) References Cited

U.S. PATENT DOCUMENTS

| | | |
|---|---|---|
| 6,522,794 B1 | 2/2003 | Bischel et al. |
| 6,527,410 B2 | 3/2003 | Yamaguchi |
| 6,538,813 B1 | 3/2003 | Magno et al. |
| 6,549,338 B1 | 4/2003 | Wolverton et al. |
| 6,570,584 B1 | 5/2003 | Cok et al. |
| 6,574,033 B1 | 6/2003 | Chui et al. |
| 6,577,429 B1 | 6/2003 | Kurtz et al. |
| 6,596,419 B1 | 7/2003 | Chen et al. |
| 6,597,419 B1 | 7/2003 | Okada et al. |
| 6,597,490 B2 | 7/2003 | Tayebati |
| 6,598,987 B1 | 7/2003 | Parikka |
| 6,630,786 B2 | 10/2003 | Cummings et al. |
| 6,630,968 B1 | 10/2003 | Tsuchihashi et al. |
| 6,636,322 B1 | 10/2003 | Terashita |
| 6,642,913 B1 | 11/2003 | Kimura et al. |
| 6,643,067 B2 | 11/2003 | Miyamae et al. |
| 6,643,069 B2 | 11/2003 | Dewald |
| 6,650,455 B2 | 11/2003 | Miles |
| 6,657,611 B1 | 12/2003 | Sterken et al. |
| 6,657,700 B2 | 12/2003 | Sako et al. |
| 6,667,782 B1 | 12/2003 | Taira et al. |
| 6,674,562 B1 | 1/2004 | Miles |
| 6,680,568 B2 | 1/2004 | Fujiwara et al. |
| 6,680,792 B2 | 1/2004 | Miles |
| 6,683,693 B1 | 1/2004 | O Tsuka et al. |
| 6,697,403 B2 | 2/2004 | Lee et al. |
| 6,700,322 B1 | 3/2004 | Duggal et al. |
| 6,738,194 B1 | 5/2004 | Ramirez et al. |
| 6,741,377 B2 | 5/2004 | Miles |
| 6,744,960 B2 | 6/2004 | Pelka |
| 6,747,785 B2 | 6/2004 | Chen et al. |
| 6,760,135 B1 | 7/2004 | Payne et al. |
| 6,760,146 B2 | 7/2004 | Ikeda et al. |
| 6,768,555 B2 | 7/2004 | Chen et al. |
| 6,773,126 B1 | 8/2004 | Hatjasalo et al. |
| 6,778,746 B2 | 8/2004 | Charlton et al. |
| 6,794,119 B2 | 9/2004 | Miles |
| 6,798,469 B2 | 9/2004 | Kimura |
| 6,806,924 B2 | 10/2004 | Niiyama et al. |
| 6,811,267 B1 | 11/2004 | Allen et al. |
| 6,822,628 B2 | 11/2004 | Dunphy et al. |
| 6,822,780 B1 | 11/2004 | Long, Jr. |
| 6,825,969 B2 | 11/2004 | Chen et al. |
| 6,841,787 B2 | 1/2005 | Almogy |
| 6,844,959 B2 | 1/2005 | Huibers et al. |
| 6,853,129 B1 | 2/2005 | Cummings et al. |
| 6,862,029 B1 | 3/2005 | D'souza et al. |
| 6,867,896 B2 | 3/2005 | Miles |
| 6,870,581 B2 | 3/2005 | Li et al. |
| 6,871,982 B2 | 3/2005 | Holman et al. |
| 6,880,959 B2 | 4/2005 | Houston |
| 6,882,458 B2 | 4/2005 | Lin et al. |
| 6,882,461 B1 | 4/2005 | Tsai et al. |
| 6,883,934 B2 | 4/2005 | Kawakami et al. |
| 6,885,377 B2 | 4/2005 | Lim et al. |
| 6,912,022 B2 | 6/2005 | Lin |
| 6,917,469 B2 | 7/2005 | Momose et al. |
| 6,930,816 B2 | 8/2005 | Mochizuki |
| 6,951,401 B2 | 10/2005 | Van Hees et al. |
| 6,954,191 B1 | 10/2005 | Hirano et al. |
| 6,967,779 B2 | 11/2005 | Fadel et al. |
| 6,972,827 B2 | 12/2005 | Mi |
| 6,982,820 B2 | 1/2006 | Tsai |
| 6,995,890 B2 | 2/2006 | Lin |
| 6,999,225 B2 | 2/2006 | Lin et al. |
| 6,999,236 B2 | 2/2006 | Lin et al. |
| 7,002,726 B2 | 2/2006 | Patel et al. |
| 7,006,272 B2 | 2/2006 | Tsai |
| 7,009,754 B2 | 3/2006 | Huibers |
| 7,012,659 B2 | 3/2006 | Smith et al. |
| 7,016,095 B2 | 3/2006 | Lin |
| 7,019,734 B2 | 3/2006 | Cross et al. |
| 7,025,464 B2 | 4/2006 | Beeson et al. |
| 7,030,554 B2 | 4/2006 | Liao et al. |
| 7,034,981 B2 | 4/2006 | Makigaki |
| 7,038,752 B2 | 5/2006 | Lin |
| 7,042,643 B2 | 5/2006 | Miles |
| 7,046,409 B2 | 5/2006 | Kihara |
| 7,050,219 B2 | 5/2006 | Kimura |
| 7,056,001 B2 | 6/2006 | Chuang |
| 7,072,093 B2 | 7/2006 | Piehl et al. |
| 7,072,096 B2 | 7/2006 | Holman et al. |
| 7,088,042 B2 | 8/2006 | Hirota et al. |
| 7,091,523 B2 | 8/2006 | Cok et al. |
| 7,110,158 B2 | 9/2006 | Miles |
| 7,113,339 B2 | 9/2006 | Taguchi |
| 7,119,945 B2 | 10/2006 | Kothari et al. |
| 7,123,216 B1 | 10/2006 | Miles |
| 7,126,738 B2 | 10/2006 | Miles |
| 7,138,984 B1 | 11/2006 | Miles |
| 7,142,347 B2 | 11/2006 | Islam |
| 7,161,728 B2 | 1/2007 | Sampsell et al. |
| 7,161,730 B2 | 1/2007 | Floyd |
| 7,176,861 B2 | 2/2007 | Dedene et al. |
| 7,187,489 B2 | 3/2007 | Miles |
| 7,198,873 B2 | 4/2007 | Geh et al. |
| 7,198,973 B2 | 4/2007 | Lin et al. |
| 7,210,806 B2 | 5/2007 | Holman et al. |
| 7,218,429 B2 | 5/2007 | Batchko |
| 7,218,812 B2 | 5/2007 | Maxwell et al. |
| 7,236,663 B2 | 6/2007 | Wakita et al. |
| 7,271,790 B2 | 9/2007 | Hudson et al. |
| 7,304,784 B2 | 12/2007 | Chui |
| 7,317,568 B2 | 1/2008 | Gally et al. |
| 7,327,510 B2 | 2/2008 | Cummings et al. |
| 7,336,329 B2 | 2/2008 | Yoon |
| 7,342,705 B2 | 3/2008 | Chui et al. |
| 7,342,709 B2 | 3/2008 | Lin |
| 7,346,251 B2 | 3/2008 | Bose et al. |
| 7,349,141 B2 | 3/2008 | Tung et al. |
| 7,360,899 B2 | 4/2008 | McGuire, Jr. et al. |
| 7,372,449 B2 | 5/2008 | Kodama et al. |
| 7,372,631 B2 | 5/2008 | Ozawa |
| 7,377,678 B2 | 5/2008 | Huang et al. |
| 7,385,748 B2 | 6/2008 | Miles |
| 7,400,439 B2 | 7/2008 | Holman |
| 7,417,784 B2 | 8/2008 | Sasagawa et al. |
| 7,420,638 B2 | 9/2008 | Tasaka et al. |
| 7,420,725 B2 | 9/2008 | Kothari |
| 7,456,805 B2 | 11/2008 | Ouderkirk et al. |
| 7,483,197 B2 | 1/2009 | Miles |
| 7,486,429 B2 | 2/2009 | Chui |
| 7,489,428 B2 | 2/2009 | Sampsell et al. |
| 7,508,571 B2 | 3/2009 | Gally et al. |
| 7,520,642 B2 | 4/2009 | Holman et al. |
| 7,525,730 B2 | 4/2009 | Floyd |
| 7,561,133 B2 | 7/2009 | Mestha et al. |
| 7,561,323 B2 | 7/2009 | Gally et al. |
| 7,564,612 B2 | 7/2009 | Chui |
| 7,595,811 B2 | 9/2009 | Matsuda |
| 7,603,001 B2 | 10/2009 | Wang et al. |
| 7,660,028 B2 | 2/2010 | Lan |
| 7,701,029 B2 | 4/2010 | Mabuchi |
| 7,710,632 B2 | 5/2010 | Cummings |
| 7,719,500 B2 | 5/2010 | Chui |
| 7,719,747 B2 | 5/2010 | Tung et al. |
| 7,742,034 B2 | 6/2010 | Jak et al. |
| 7,750,886 B2 | 7/2010 | Sampsell |
| 7,807,488 B2 | 10/2010 | Gally et al. |
| 7,855,824 B2 | 12/2010 | Gally |
| 7,898,521 B2 | 3/2011 | Gally |
| 7,907,319 B2 | 3/2011 | Miles |
| 7,911,428 B2 | 3/2011 | Gally |
| 7,916,378 B2 | 3/2011 | Wang |
| 7,928,928 B2 | 4/2011 | Gally et al. |
| 7,929,196 B2 | 4/2011 | Gally et al. |
| 8,004,743 B2 | 8/2011 | Mignard |
| 8,031,133 B2 | 10/2011 | Gally et al. |
| 8,045,252 B2 | 10/2011 | Chui et al. |
| 8,054,528 B2 | 11/2011 | Cummings |
| 8,072,402 B2 | 12/2011 | Xu |
| 8,077,380 B2 | 12/2011 | Mignard |
| 8,102,407 B2 | 1/2012 | Gally et al. |
| 8,111,445 B2 | 2/2012 | Chui et al. |

(56) References Cited

U.S. PATENT DOCUMENTS

| | | | |
|---|---|---|---|
| 8,344,377 B2 | 1/2013 | Gally et al. |
| 8,416,154 B2 | 4/2013 | Gally et al. |
| 2001/0003487 A1 | 6/2001 | Miles |
| 2001/0003504 A1 | 6/2001 | Ishihara et al. |
| 2001/0010952 A1 | 8/2001 | Abramovich |
| 2001/0019240 A1 | 9/2001 | Takahashi |
| 2001/0019380 A1 | 9/2001 | Ishihara |
| 2001/0019479 A1 | 9/2001 | Nakabayashi et al. |
| 2001/0049061 A1 | 12/2001 | Nakagaki et al. |
| 2001/0050757 A1 | 12/2001 | Yoshida et al. |
| 2002/0006044 A1 | 1/2002 | Harbers et al. |
| 2002/0050286 A1 | 5/2002 | Kubota |
| 2002/0054424 A1* | 5/2002 | Miles ............................ 359/291 |
| 2002/0075245 A1 | 6/2002 | Kawashima et al. |
| 2002/0075555 A1 | 6/2002 | Miles |
| 2002/0080465 A1 | 6/2002 | Han et al. |
| 2002/0106182 A1 | 8/2002 | Kawashima |
| 2002/0131151 A1 | 9/2002 | Engler et al. |
| 2002/0149584 A1 | 10/2002 | Simpson et al. |
| 2002/0154215 A1 | 10/2002 | Schechterman et al. |
| 2002/0154256 A1 | 10/2002 | Gotoh et al. |
| 2002/0167730 A1 | 11/2002 | Needham et al. |
| 2002/0191130 A1 | 12/2002 | Liang et al. |
| 2003/0006730 A1 | 1/2003 | Tachibana |
| 2003/0011864 A1 | 1/2003 | Flanders |
| 2003/0020672 A1 | 1/2003 | Takatori |
| 2003/0083429 A1 | 5/2003 | Smith et al. |
| 2003/0090887 A1 | 5/2003 | Igarashi et al. |
| 2003/0095401 A1 | 5/2003 | Hanson et al. |
| 2003/0107692 A1 | 6/2003 | Sekiguchi |
| 2003/0136759 A1 | 7/2003 | Mikolas |
| 2003/0146893 A1 | 8/2003 | Sawabe |
| 2003/0151821 A1 | 8/2003 | Favalora et al. |
| 2003/0160919 A1 | 8/2003 | Suzuki et al. |
| 2003/0161040 A1 | 8/2003 | Ishii et al. |
| 2003/0169385 A1 | 9/2003 | Okuwaki |
| 2003/0193630 A1 | 10/2003 | Chiou |
| 2003/0206281 A1 | 11/2003 | Jain |
| 2003/0210363 A1 | 11/2003 | Yasukawa |
| 2003/0213514 A1 | 11/2003 | Ortabasi |
| 2003/0214621 A1 | 11/2003 | Kim et al. |
| 2003/0231483 A1 | 12/2003 | Higashiyama |
| 2004/0001169 A1 | 1/2004 | Saiki et al. |
| 2004/0017599 A1 | 1/2004 | Yang |
| 2004/0027315 A1 | 2/2004 | Senda et al. |
| 2004/0027701 A1 | 2/2004 | Ishikawa |
| 2004/0051724 A1 | 3/2004 | Elliott et al. |
| 2004/0051929 A1 | 3/2004 | Sampsell et al. |
| 2004/0066477 A1 | 4/2004 | Morimoto et al. |
| 2004/0070711 A1 | 4/2004 | Wen et al. |
| 2004/0100594 A1 | 5/2004 | Huibers et al. |
| 2004/0113875 A1 | 6/2004 | Miller et al. |
| 2004/0114242 A1 | 6/2004 | Sharp |
| 2004/0115339 A1 | 6/2004 | Ito |
| 2004/0125048 A1 | 7/2004 | Fukuda et al. |
| 2004/0147198 A1 | 7/2004 | Lin |
| 2004/0175577 A1 | 9/2004 | Lin et al. |
| 2004/0188599 A1 | 9/2004 | Viktorovitch |
| 2004/0209195 A1 | 10/2004 | Lin |
| 2004/0217919 A1 | 11/2004 | Piehl et al. |
| 2004/0233357 A1 | 11/2004 | Fujimori et al. |
| 2004/0233503 A1 | 11/2004 | Kimura |
| 2004/0240032 A1 | 12/2004 | Miles |
| 2005/0002082 A1 | 1/2005 | Miles |
| 2005/0010568 A1 | 1/2005 | Nagatomo et al. |
| 2005/0024890 A1 | 2/2005 | Yamamoto et al. |
| 2005/0035699 A1 | 2/2005 | Tsai |
| 2005/0036095 A1 | 2/2005 | Yeh et al. |
| 2005/0042117 A1 | 2/2005 | Lin |
| 2005/0057442 A1 | 3/2005 | Way |
| 2005/0069209 A1 | 3/2005 | Damera-Venkata et al. |
| 2005/0083352 A1 | 4/2005 | Higgins |
| 2005/0101059 A1 | 5/2005 | Yang |
| 2005/0117623 A1 | 6/2005 | Shchukin et al. |
| 2005/0120553 A1 | 6/2005 | Brown et al. |
| 2005/0133761 A1 | 6/2005 | Thielemans |
| 2005/0195370 A1 | 9/2005 | Gore et al. |
| 2005/0195462 A1 | 9/2005 | Lin |
| 2005/0224694 A1 | 10/2005 | Yaung |
| 2005/0225686 A1 | 10/2005 | Brummack et al. |
| 2005/0271325 A1 | 12/2005 | Anderson et al. |
| 2005/0286113 A1 | 12/2005 | Miles |
| 2006/0001942 A1 | 1/2006 | Chui et al. |
| 2006/0002141 A1 | 1/2006 | Ouderkirk et al. |
| 2006/0006641 A1 | 1/2006 | Hada et al. |
| 2006/0012733 A1 | 1/2006 | Jin et al. |
| 2006/0022966 A1 | 2/2006 | Mar |
| 2006/0028708 A1 | 2/2006 | Miles |
| 2006/0062016 A1 | 3/2006 | Dejima et al. |
| 2006/0065940 A1 | 3/2006 | Kothari |
| 2006/0066557 A1 | 3/2006 | Floyd |
| 2006/0066586 A1 | 3/2006 | Gally et al. |
| 2006/0073623 A1 | 4/2006 | Conley, Jr. et al. |
| 2006/0077126 A1 | 4/2006 | Kothari |
| 2006/0077127 A1 | 4/2006 | Sampsell et al. |
| 2006/0077148 A1 | 4/2006 | Gally et al. |
| 2006/0077149 A1 | 4/2006 | Gally |
| 2006/0103912 A1 | 5/2006 | Katoh et al. |
| 2006/0109682 A1 | 5/2006 | Ko et al. |
| 2006/0110090 A1 | 5/2006 | Ellwood, Jr. |
| 2006/0130889 A1 | 6/2006 | Li et al. |
| 2006/0132383 A1 | 6/2006 | Gally et al. |
| 2006/0180886 A1 | 8/2006 | Tsang |
| 2006/0187676 A1 | 8/2006 | Ishikura |
| 2006/0198013 A1 | 9/2006 | Sampsell |
| 2006/0201546 A1 | 9/2006 | Yokoyama |
| 2006/0209012 A1 | 9/2006 | Hagood, IV |
| 2006/0209385 A1 | 9/2006 | Liu et al. |
| 2006/0227532 A1 | 10/2006 | Ko et al. |
| 2006/0250676 A1 | 11/2006 | Hagood, IV et al. |
| 2006/0274243 A1 | 12/2006 | Iijima et al. |
| 2006/0279558 A1 | 12/2006 | Van Delden et al. |
| 2006/0286381 A1 | 12/2006 | Naito et al. |
| 2006/0291769 A1 | 12/2006 | Spoonhower et al. |
| 2007/0031097 A1 | 2/2007 | Heikenfeld et al. |
| 2007/0031685 A1 | 2/2007 | Ko et al. |
| 2007/0036492 A1 | 2/2007 | Lee |
| 2007/0042524 A1 | 2/2007 | Kogut et al. |
| 2007/0064446 A1 | 3/2007 | Sharma et al. |
| 2007/0085789 A1 | 4/2007 | De Vaan |
| 2007/0092728 A1 | 4/2007 | Ouderkirk et al. |
| 2007/0113887 A1 | 5/2007 | Laih et al. |
| 2007/0115415 A1 | 5/2007 | Piehl |
| 2007/0132843 A1 | 6/2007 | Miles |
| 2007/0147087 A1 | 6/2007 | Parker et al. |
| 2007/0195392 A1 | 8/2007 | Phillips et al. |
| 2007/0201234 A1 | 8/2007 | Ottermann |
| 2007/0206267 A1 | 9/2007 | Tung et al. |
| 2007/0210163 A1 | 9/2007 | Han |
| 2007/0235072 A1 | 10/2007 | Bermel et al. |
| 2007/0253054 A1 | 11/2007 | Miles |
| 2007/0279727 A1 | 12/2007 | Gandhi et al. |
| 2007/0281241 A1 | 12/2007 | Wolk et al. |
| 2008/0030657 A1 | 2/2008 | Wu et al. |
| 2008/0090025 A1 | 4/2008 | Freking et al. |
| 2008/0095997 A1 | 4/2008 | Chiang et al. |
| 2008/0105298 A1 | 5/2008 | Lu et al. |
| 2008/0232135 A1 | 9/2008 | Kinder et al. |
| 2008/0288225 A1 | 11/2008 | Djordjev |
| 2009/0050454 A1 | 2/2009 | Matsukawa et al. |
| 2009/0073540 A1 | 3/2009 | Kothari et al. |
| 2009/0090611 A1 | 4/2009 | Zeijlon et al. |
| 2009/0101192 A1 | 4/2009 | Kothari et al. |
| 2009/0103161 A1 | 4/2009 | Kothari et al. |
| 2009/0103165 A1 | 4/2009 | Kothari et al. |
| 2009/0147535 A1 | 6/2009 | Mienko et al. |
| 2009/0151771 A1 | 6/2009 | Kothari et al. |
| 2009/0190373 A1 | 7/2009 | Bita et al. |
| 2009/0225396 A1 | 9/2009 | Sampsell |
| 2009/0225435 A1 | 9/2009 | Boettiger et al. |
| 2009/0231524 A1 | 9/2009 | Tanaka |
| 2009/0242024 A1 | 10/2009 | Kothari et al. |
| 2009/0251783 A1 | 10/2009 | Huibers et al. |
| 2009/0293955 A1 | 12/2009 | Kothari et al. |

(56) References Cited

U.S. PATENT DOCUMENTS

| | | | |
|---|---|---|---|
| 2009/0296191 A1 | 12/2009 | Floyd | |
| 2009/0296194 A1 | 12/2009 | Gally et al. | |
| 2009/0310208 A1 | 12/2009 | Wang et al. | |
| 2009/0323153 A1 | 12/2009 | Sampsell | |
| 2010/0014148 A1 | 1/2010 | Djordjev | |
| 2010/0026727 A1 | 2/2010 | Bita et al. | |
| 2010/0096006 A1 | 4/2010 | Griffiths et al. | |
| 2010/0096011 A1 | 4/2010 | Griffiths et al. | |
| 2010/0141557 A1 | 6/2010 | Gruhlke et al. | |
| 2010/0157406 A1 | 6/2010 | Gruhlke et al. | |
| 2010/0214642 A1 | 8/2010 | Miles | |
| 2010/0245370 A1 | 9/2010 | Narayanan et al. | |
| 2010/0302616 A1 | 12/2010 | Bita et al. | |
| 2010/0302803 A1 | 12/2010 | Bita et al. | |
| 2011/0075246 A1 | 3/2011 | Wang | |
| 2011/0128307 A1 | 6/2011 | Gally et al. | |
| 2011/0141163 A1 | 6/2011 | Gally et al. | |
| 2011/0148751 A1 | 6/2011 | Gally et al. | |
| 2011/0193770 A1 | 8/2011 | Gally et al. | |
| 2012/0026176 A1 | 2/2012 | Cummings | |
| 2012/0062572 A1 | 3/2012 | Mignard | |
| 2012/0075269 A1 | 3/2012 | Xu et al. | |
| 2012/0099177 A1 | 4/2012 | Chui et al. | |
| 2013/0009855 A1 | 1/2013 | Gally et al. | |
| 2013/0100003 A1 | 4/2013 | Gally et al. | |

FOREIGN PATENT DOCUMENTS

| | | |
|---|---|---|
| CN | 1272922 | 11/2000 |
| CN | 1286424 | 3/2001 |
| CN | 1381752 A | 11/2002 |
| CN | 1409157 A | 4/2003 |
| CN | 1517743 A | 8/2004 |
| DE | 3402746 | 8/1985 |
| DE | 19622748 | 12/1997 |
| DE | 10329917 | 2/2005 |
| DE | 102006039071 A1 | 2/2008 |
| EP | 0223136 A2 | 5/1987 |
| EP | 0330361 A2 | 8/1989 |
| EP | 0366117 A2 | 5/1990 |
| EP | 0389031 A1 | 9/1990 |
| EP | 0590511 A1 | 4/1994 |
| EP | 0667548 A1 | 8/1995 |
| EP | 0695959 A1 | 2/1996 |
| EP | 0786911 A2 | 7/1997 |
| EP | 0822441 A2 | 2/1998 |
| EP | 0830032 A2 | 3/1998 |
| EP | 0855745 A2 | 7/1998 |
| EP | 1003062 A1 | 5/2000 |
| EP | 1014161 A1 | 6/2000 |
| EP | 1020765 A1 | 7/2000 |
| EP | 1081633 A2 | 3/2001 |
| EP | 1093105 A1 | 4/2001 |
| EP | 1205782 A2 | 5/2002 |
| EP | 1251454 A2 | 10/2002 |
| EP | 1271223 A2 | 1/2003 |
| EP | 1298635 A2 | 4/2003 |
| EP | 1336876 A1 | 8/2003 |
| EP | 1341025 A1 | 9/2003 |
| EP | 1389775 A2 | 2/2004 |
| EP | 1413543 A1 | 4/2004 |
| EP | 1450418 A2 | 8/2004 |
| EP | 1640761 | 3/2006 |
| EP | 1640762 | 3/2006 |
| EP | 1670065 A1 | 6/2006 |
| EP | 1767981 | 3/2007 |
| EP | 1800183 | 6/2007 |
| EP | 1807725 | 7/2007 |
| EP | 2 030 947 | 3/2009 |
| EP | 1 800 172 B1 | 2/2011 |
| FR | 2760559 A1 | 9/1998 |
| GB | 2278222 | 11/1994 |
| GB | 2315356 A | 1/1998 |
| GB | 2321532 A | 7/1998 |
| JP | 56088111 | 7/1981 |
| JP | 60-130715 | 7/1985 |
| JP | 60147718 | 8/1985 |
| JP | 60165621 A | 8/1985 |
| JP | 61-124923 | 6/1986 |
| JP | 62009317 | 1/1987 |
| JP | 63-309917 | 12/1988 |
| JP | 64-032289 | 2/1989 |
| JP | 2068513 A | 3/1990 |
| JP | 02151079 | 6/1990 |
| JP | 03 296720 | 12/1991 |
| JP | 04081816 | 3/1992 |
| JP | 04190323 | 7/1992 |
| JP | 4211216 A | 8/1992 |
| JP | 04238321 | 8/1992 |
| JP | 05281479 | 10/1993 |
| JP | 6265870 A | 9/1994 |
| JP | 07509327 | 10/1995 |
| JP | 8018990 A | 1/1996 |
| JP | 8050283 A | 2/1996 |
| JP | 08094992 | 4/1996 |
| JP | 8184822 A | 7/1996 |
| JP | 8189990 A | 7/1996 |
| JP | 09068722 | 3/1997 |
| JP | 9134783 A | 5/1997 |
| JP | 09-189910 | 7/1997 |
| JP | 09189869 A | 7/1997 |
| JP | 09507920 | 8/1997 |
| JP | 09281917 | 10/1997 |
| JP | 10 500224 | 1/1998 |
| JP | 10096910 A | 4/1998 |
| JP | 10186249 A | 7/1998 |
| JP | 10222047 A | 8/1998 |
| JP | 10319877 A | 12/1998 |
| JP | 11002712 A | 1/1999 |
| JP | 11002764 A | 1/1999 |
| JP | 11064882 A | 3/1999 |
| JP | 11174234 | 7/1999 |
| JP | 11 211999 | 8/1999 |
| JP | 11258558 A | 9/1999 |
| JP | 11295725 | 10/1999 |
| JP | 11295726 A | 10/1999 |
| JP | 11355797 A | 12/1999 |
| JP | 2000 500245 | 1/2000 |
| JP | 2000028933 A | 1/2000 |
| JP | 2000075267 A | 3/2000 |
| JP | 2000075293 A | 3/2000 |
| JP | 2000089733 A | 3/2000 |
| JP | 2000193933 A | 7/2000 |
| JP | 2000214804 A | 8/2000 |
| JP | 2000231092 A | 8/2000 |
| JP | 2000258622 A | 9/2000 |
| JP | 2000514568 | 10/2000 |
| JP | 2001305312 | 10/2001 |
| JP | 2001522061 A | 11/2001 |
| JP | 2001343514 | 12/2001 |
| JP | 2001345458 | 12/2001 |
| JP | 2002 062505 A | 2/2002 |
| JP | 2002040339 A | 2/2002 |
| JP | 2002041017 A | 2/2002 |
| JP | 2002062492 | 2/2002 |
| JP | 2002062493 A | 2/2002 |
| JP | 2002149116 A | 5/2002 |
| JP | 2002174780 | 6/2002 |
| JP | 2002523798 | 7/2002 |
| JP | 2002-229023 | 8/2002 |
| JP | 2002221931 A | 8/2002 |
| JP | 2002245835 A | 8/2002 |
| JP | 2002287047 A | 10/2002 |
| JP | 2002297044 | 10/2002 |
| JP | 2002 328313 | 11/2002 |
| JP | 2003 021821 A | 1/2003 |
| JP | 2003-029169 | 1/2003 |
| JP | 2003057653 A | 2/2003 |
| JP | 2003070017 A | 3/2003 |
| JP | 2003131215 | 5/2003 |
| JP | 2003186008 A | 7/2003 |
| JP | 2003209855 A | 7/2003 |
| JP | 2003248181 A | 9/2003 |

(56) References Cited

FOREIGN PATENT DOCUMENTS

| | | | |
|---|---|---|---|
| JP | 2003255324 A | 9/2003 | |
| JP | 2003255379 A | 9/2003 | |
| JP | 2003-307734 | 10/2003 | |
| JP | 2003295160 A | 10/2003 | |
| JP | 2003315694 A | 11/2003 | |
| JP | 2003315732 A | 11/2003 | |
| JP | 2004012918 | 1/2004 | |
| JP | 2004062099 | 2/2004 | |
| JP | 2004111278 A | 4/2004 | |
| JP | 2004117815 A | 4/2004 | |
| JP | 2004510185 | 4/2004 | |
| JP | 2004-206049 | 7/2004 | |
| JP | 2004-212922 | 7/2004 | |
| JP | 2004205973 A | 7/2004 | |
| JP | 2004212673 A | 7/2004 | |
| JP | 2004219843 A | 8/2004 | |
| JP | 2005527861 A | 9/2005 | |
| JP | 2005308871 A | 11/2005 | |
| JP | 2006120571 | 5/2006 | |
| JP | 2008514994 A | 5/2008 | |
| JP | 2008224930 A | 9/2008 | |
| KR | 102001009959 | 11/2001 | |
| KR | 20020010322 | 2/2002 | |
| KR | 20030029769 | 4/2003 | |
| KR | 20030081662 | 10/2003 | |
| KR | 20040016570 A | 2/2004 | |
| KR | 20040060704 A | 7/2004 | |
| TW | 411706 B | 11/2000 | |
| TW | 504583 B | 10/2002 | |
| TW | 530424 B | 5/2003 | |
| TW | 541720 B | 7/2003 | |
| TW | 556009 B | 10/2003 | |
| TW | 200402014 | 2/2004 | |
| TW | 200410191 | 6/2004 | |
| WO | WO-9501584 A1 | 1/1995 | |
| WO | WO-9514256 A1 | 5/1995 | |
| WO | WO-9608833 A1 | 3/1996 | |
| WO | WO 97/17628 | 5/1997 | |
| WO | WO-9744707 A2 | 11/1997 | |
| WO | WO-9746908 A1 | 12/1997 | |
| WO | WO-9963394 A1 | 12/1999 | |
| WO | WO-9967680 A1 | 12/1999 | |
| WO | WO-0011502 A1 | 3/2000 | |
| WO | WO-0070597 A1 | 11/2000 | |
| WO | WO-0181994 A1 | 11/2001 | |
| WO | WO-0184228 A1 | 11/2001 | |
| WO | WO-0224570 A1 | 3/2002 | |
| WO | WO-02071132 A2 | 9/2002 | |
| WO | WO-03032058 A1 | 4/2003 | |
| WO | WO-03075207 A2 | 9/2003 | |
| WO | WO-03100756 A2 | 12/2003 | |
| WO | WO-03105198 A1 | 12/2003 | |
| WO | WO-2004036270 A1 | 4/2004 | |
| WO | WO-2004068460 A1 | 8/2004 | |
| WO | WO-2005011012 A1 | 2/2005 | |
| WO | WO-2005088367 A1 | 9/2005 | |
| WO | WO 2006/036519 | 4/2006 | |
| WO | WO 2006/036540 | 4/2006 | |
| WO | WO-2006036440 | 4/2006 | |
| WO | WO-2006036451 A1 | 4/2006 | |
| WO | WO-2006036496 | 4/2006 | |
| WO | WO-2006036524 | 4/2006 | |
| WO | WO-2006036559 | 4/2006 | |
| WO | WO-2006076051 A1 | 7/2006 | |
| WO | WO-2006137337 | 12/2006 | |
| WO | WO-2007142978 A2 | 12/2007 | |
| WO | WO-2008045311 A2 | 4/2008 | |
| WO | WO-2008067024 A2 | 6/2008 | |
| WO | WO-2009011922 A1 | 1/2009 | |
| WO | WO 2009/032525 | 3/2009 | |
| WO | WO-2009120610 | 10/2009 | |
| WO | WO 2011/146413 | 11/2011 | |

OTHER PUBLICATIONS

Optical Constants of InP (Indium Phosphide), RefractiveIndex.INFO—Refractive Index Database http://refractiveindex.info/?group=CRYSTALS&material=InP at least as of Jul. 6, 2011.
Optical Constants of poly-Si (Polysilicon), RefractiveIndex.INFO—Refractive Index Database http://refractiveindex.info/?group=CRYSTALS&material=poly-Si at least as of Jul. 6, 2011.
Refractive Index of n of $In_xGa_{1-x}As$ alloys, BATOP Optoelectronics http://www.batop.de/information/n_InGaAs.html at least as of Jul. 6, 2011.
Refractive Index of GaAs, Gallium Arsenide, FILMETRICS http://www.filmetrics.com/refractive-index-database/GaAs/Gallium-Arsenide at least as of Jul. 6, 2011.
Invitation to Pay Additional Fees in International Application No. PCT/US2011/036690 mailed May 11, 2012.
International Preliminary Report on Patentability in International Application No. PCT/US2011/036690 dated Jul. 18, 2012.
Miles, M.W., "A Mems Based Interferometric Modulator (IMOD) for Display Applications," Proceedings of Sensors Expo, pp. 281-284, Oct. 21, 1997, XP009058455.
Office Action in U.S. Appl. No. 11/213,659 dated Oct. 29, 2008.
Amendment and Response in U.S. Appl. No. 11/213,659 dated Mar. 30, 2009.
Amendment and Information Disclosure Statement in U.S. Appl. No. 11/213,659, dated Feb. 25, 2010.
Request for Continued Examination, Information Disclosure Statement, and Petition to Withdraw from Issue in U.S. Appl. No. 11/213,659, dated Aug. 18, 2010.
Petition Grant in U.S. Appl. No. 11/213,659, dated Aug. 19, 2010.
Amendment in U.S. Appl. No. 11/213,659, dated Aug. 27, 2010.
Application as Filed in U.S. Appl. No. 12/831,517, dated Jul. 7, 2010.
Notice of Abandonment in U.S. Appl. No. 12/831,517, dated Mar. 28, 2011.
Preliminary Amendment in U.S. Appl. No. 13/016,107, dated Apr. 25, 2011.
Second Preliminary Amendment in U.S. Appl. No. 13/016,107, dated May 24, 2011.
Office Action in European Application No. EP 05800920.0 dated May 21, 2008.
Summons to attend oral proceedings in European Application No. 05800920, dated Dec. 4, 2009.
Result of consultation in European Application No. 05800920, dated Feb. 23, 2010.
Minutes of the Oral Proceedings in European Application No. 05 800 920.1, dated May 20, 2010.
Notice of Intention to Grant in European Application No. 05800920, dated Jun. 2, 2010.
International Search Report and Written Opinion in PCT/US2005/032633 (International Publication No. WO 2006/036540) dated Feb. 6, 2006.
International Preliminary Report on Patentability in PCT/US2005/032633 (International Publication No. WO 2006/036540) dated Apr. 5, 2007.
Office Communication from the USPTO for U.S. Appl. No. 11/208,085 dated Dec. 10, 2008.
Amendment and Response in U.S. Appl. No. 11/208,085 dated Jun. 8, 2009.
Preliminary Amendment and Information Disclosure Statement in U.S. Appl. No. 11/208,085, dated Dec. 14, 2009.
Amendment After Notice of Allowance and Issue Fee Payment in U.S. Appl. No. 11/208,085, dated Mar. 26, 2010.
Response to Rule 312 Communication in U.S. Appl. No. 11/208,085 dated Apr. 15, 2010.
Request for Continued Examination, Amendment, and Petition to Withdraw from Issue in U.S. Appl. No. 11/208,085, dated May 25, 2010.
Granted Petition to Withdraw from Issue in U.S. Appl. No. 11/208,085, dated May 27, 2010.
Preliminary Amendment in U.S. Appl. No. 11/208,085, dated Oct. 8, 2010.
Official Communication in Japanese Application No. 2010-273682, dated Sep. 20, 2011.
Official Communication in Japanese Application No. 2007-533524, dated Jun. 8, 2010.

(56) References Cited

OTHER PUBLICATIONS

Official Communication in Japanese Application No. 2007-533524, dated Sep. 20, 2011.
International Search Report in PCT/US2005/032335 (International Publication No. WO 2006/036519) dated Dec. 30, 2005.
International Preliminary Report on Patentability in PCT/US2005/032335 (International Publication No. WO 2006/036519) dated Apr. 5, 2007.
Application as Filed in U.S. Appl. No. 13/308,430, dated Nov. 30, 2011.
Office Action in Chinese Patent Application No. 200880107832.6, dated Jul. 27, 2011.
Extended European Search Report in Application No. 08153441.4 (Publication No. EP 2030947) dated Mar. 25, 2009.
International Search Report and Written Opinion in PCT/US2008/073610 (Publication No. WO 2009/032525) dated Apr. 6, 2009.
International Preliminary Report on Patentability and Written Opinion in PCT/US2008/073610 (Publication No. WO 2009/032525) dated Nov. 30, 2009.
International Search Report and Written Opinion in PCT/US2011/036690 dated Sep. 27, 2011.
Invitation to Pay Additional Fees in International Application No. PCT/US2011/036690 mailed Aug. 4, 2011.
Abilieah A, "Optical Tiled AMLCD for Very Large Display Applications," SID International Symposium Digest of Papers, Boston, 1992, 945-949.
"Analysis of the Primary Processes in the Growth of Quantum Dot Nano-crystals at Solid—Liquid Interfaces," Translation of the AIST press, release of Apr. 14, 2008, downloaded from http://www.aist.go.jp/aist e/latest research/2006/20060601/20060601.html on Feb. 8, 2011.
Aratani K, et al., "Process and Design Considerations for Surface Micromachined Beams for a Tuneable Interferometer Array in Silicon," Proc. IEEE Microelectromechanical Workshop Fort Lauderdale FL, 1993, 230-235.
Aratani K. et al., "Surface Micromachined Tuneable Interferometer Array," Sensors and Actuators A,Elsevier Sequoia S.A., Lausanne, CH, A, 1994, 43(1/3), 17-23.
Austrian Search Report dated Aug. 12, 2005 in U.S. Appl. No. 11/118,110.
Austrian Search Report for U.S. Appl. No. 11/036,965 dated Jul. 25, 2005 (Publication No. 2005/0179977).
Austrian Search Report for U.S. Appl. No. 11/052,004 dated Jul. 1, 2005 (Publication No. 2006/077509).
Austrian Search Report for U.S. Appl. No. 11/064,143 dated Aug. 12, 2005.
Austrian Search Report for U.S. Appl. No. 11/140,561 dated Jul. 12, 2005.
Austrian Search Report for U.S. Appl. No. 11/051,258 dated May 13, 2005.
Austrian Search Report for U.S. Appl. No. 11/077,974 dated Jul. 14, 2005.
Austrian Search Report in U.S. Appl. No. 11/083,841 mailed Jul. 14, 2005.
Austrian Search Report in U.S. Appl. No. 11/118,605 mailed Jul. 14, 2005.
Austrian Search Report No. 141/2005, mailed on Aug. 12, 2005.
Austrian Search Report No. 162/2005, dated Jul. 14, 2005.
Austrian Search Report No. 167/2005, mailed on Jul. 14, 2005.
Chemical Properties Handbook, McGraw-Hill, 1999, Refractive Index, Dipole Moment and Radius of Gyration; Inorganic Compounds, No. 151: O2Si.
CIE Color Space, from website hyperphysics.phy-astr.gsu.edu.hbase/vision/cie.html.
Conner, "Hybrid Color Display using Optical Interference Filter Array," SID Digest, 1993, 577-580.
Demiryont, et al., "Innovative Transparent Electrode for Flexible Displays," Defense, Security, Cockpit and Future Display II, Proc. of SPIE, Apr. 2006, vol. 6225, pp. 622519-1 to 622519-9.

Dewitt S, "Integrating Touch Screens and Optical Films When, Where, and How," 3M Touch Systems Society for Information Display, Americas Display Engineering & Applications Conference, Oct. 24-27, 2005, Portland, Oregon U.S.A.
Fan, et al., "Channel Drop Filters in Photonic Crystals," Optics Express, 1998, vol. 3(1), pp. 4-11.
Giles, et al., "A Silicon Mems Optical Switch Attenuator And Its Use In Lightwave Subsystems," IEEE Journal of Selected Topics in Quantum Electronics, 1999, 5(1), 18-25.
"Glass Polarizing and Interference Filters," American Institute Of Physics Handbook, 1982, pp. 6-172 to 6-178.
Goossen, et al., "Silicon Modulator Based on Mechnically-Active Anti-Reflection Layer With 1Mbit/Sec Capability For Fiber-In-The-Loop Applications,"0 IEEE Photonics Technology Letters, 1994, 1119-1121.
Hohlfeld, et al., "Micro-Machined Tunable Optical Filters With Optimized Band-Pass Spectrum," 12th International Conference on Transducers, Solid-State Sensors, Actuators and Microsystems, 2003, vol. 2, 1494-1497.
Huang, et al., "Multidirectional Asymmetrical Microlens-Array Light Control Films for High Performance Reflective Liquid Crystals Displays," SID Digest, 2002, pp. 870-873.
"Image technology colour management—Architecture, profile format, and data structure", Specification ICC.1:2004-10 (Profile version 4.2.0.0) International Color Consortium 2004, available at http:"L/vywy.y"colorpmdCCj.y4Z__ZQMT95,pcjf, May 22, 2006, in 112 pages.
Jerman, et al., "A Miniature Fabry-Perot Interferometer Fabricated Using Silicon Micromachining Techniques," IEEE Electron Devices Society, 1988.
Jerman et al., "A Miniature Fabry-Perot Interferometer with a Corrugated Silicon Diaphragm Support", IEEE Electron Devices Society, pp. 140-144, 1990.
Lau, "The Characterization of Silicon Dioxide and Silicon Nitride Thin Films, in Infrared Characterization for Microelectronics," World Scientific Publishing Co. Pte. Ltd., New Jersey, 1999, 5, pp. 55-71.
Lin, et al., "Development of UV Stable LED Encapsulants," Microsystems, Packaging, Assembly and Circuits Technology Conference, IMPACT 2009, 4th, 565-567.
Little, et al., "Vertically Coupled Glass Microring Resonator Channel Dropping Filter," IEEE Photonics Technology Letters, 1999, 11(2), 215-217.
MacLeod H.A., "Thin Film Optical Filters" Third Edition Institute of Physics Publishing, 2001, pp. 176-177.
Magel G.A., "Integrated Optic Devices using Micromachined Metal Membranes," SPIE, 1996, vol. 2686, 54-63.
Manzardo, et al., "Optics and Actuators for Miniaturized Spectrometers," International Conference on Optical MEMS, 2000, 12(6), 23-24.
Mehregany, et al., "MEMS Applications in Optical Systems," IEEE/LEOS 1996 Summer Topical Meetings, 1996, 75-76.
Miles M., et al., "Digital Paper (TM) for reflective displays", Journal of the Society for Information Display, Society for Information Display, vol. 11 (1), pp. 209-215, 2003, XP002358929, ISSN: 1071-0922.
Miles M.W., "A New Reflective FPD Technology using Interferometric Modulation," Journal of the SID, 1997, vol. 5(4), 379-382.
Miles M.W. et al., "Interferometric Modulation: a MEMS Based Technology for the Modulation of Light," Final Program and Proceedings IS&T's 50th Annual Conference, 1997, pp. 674-677.
Miles M.W., et al., "Interferometric Modulation MOEMS as an enabling technology for high-performance reflective displays," Proceedings of the SPIE, 2003, 4985, 131-139.
Miles M.W., "MEMS-Based Interferometric Modulator for Display Applications," Proceedings of SPIE Conference on Micromachined Devices and Components V, Sep. 1999, SPIE vol. 3876, pp. 20-28.
Nakagawa et al., "Wide-Field-of-View Narrow-Band Spectral Filters Based on Photonic Crystal Nanocavities" Optical Society of America, Optics Letters, vol. 27, No. 3, pp. 191-193, Feb. 1, 2002.

(56) References Cited

OTHER PUBLICATIONS

Neal T.D. et al., "Surface Plasmon Enhanced Emission From Dye Doped Polymer Layers," Optics Express Opt. Soc. America, USA, Jul. 11, 2005, vol. 13(14), 5522-5527.

Petschick, et.al., "Fabry-Perot-Interferometer," available at http://pl.physik.tuberlin.de/groups/pg279/protokolless02/04_fpi.pdf, pp. 50-60, May 14, 2002.

Raley, et al., "A Fabry-Perot Microinterferometer for Visible Wavelengths," IEEE Solid-State Sensor and Actuator Workshop, 1992, 170-173.

Sperger, et al., "High Performance Patterned All-Dielectric Interference Colour Filter for Display Applications," SID Digest, 1994, 81-83.

Tai C. Y., et al., "A Transparent Frontlighting System for Reflective-type Displays," SID International Symposium Digest of Technical Papers, Orlando, SID International Symposium Digest of Technical Papers, Santa Ana, SID, vol. 26, 375-378,1995, (XP000657155).

Walker, et al., "Electron-Beam-Tunable Interference Filter Spatial Light Modulator," Optics Letters, 1988, vol. 13(5), 345-347.

Wu, et al., "Design of a Reflective Color LCD using Optical Interference Reflectors," ASIA DISPLAY, Changchun Institute of Physics, 1995, 929-931.

\* cited by examiner

| | Common Voltages | | | | |
|---|---|---|---|---|---|
| Segment Voltages | $VC_{ADD\_H}$ | $VC_{HOLD\_H}$ | $VC_{REL}$ | $VC_{HOLD\_L}$ | $VC_{ADD\_L}$ |
| $VS_H$ | Stable | Stable | Relax | Stable | Actuate |
| $VS_L$ | Actuate | Stable | Relax | Stable | Stable |

METHOD AND STRUCTURE CAPABLE OF CHANGING COLOR SATURATION

CROSS-REFERENCE TO RELATED APPLICATIONS

This disclosure claims priority to U.S. Provisional Patent Application No. 61/346,846 filed May 20, 2010, entitled "METHOD AND STRUCTURE CAPABLE OF CHANGING COLOR SATURATION," and assigned to the assignee hereof. The disclosure of the prior application is considered part of, and is incorporated by reference in, this disclosure.

TECHNICAL FIELD

This disclosure relates to displays including electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a metallic membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in a device for modulating light, the device comprising: a movable reflector; a partial reflector positioned at a first distance from said movable reflector; a substrate positioned at a fixed distance from said partial reflector, the substrate having an index of refraction different from the partial reflector; and a multilayer configured to provide a refractive index gradient between the partial reflector and the substrate, the multilayer including at least two dielectric layers, wherein the respective indices of refraction of the at least two dielectric layers are configured to provide a reduction in the index of refraction from the partial reflector to the substrate thereby increasing the color saturation of light reflected by the device.

In some implementations the index of refraction of the partial reflector can be larger than the index of refraction of the substrate. In some implementations at least one dielectric layer included in the multilayer can form a color filter. In some implementations the color filter can be a red color filter that substantially suppresses light wavelengths associated with cyan hues. In some implementations the color filter can be a blue color filter that substantially suppresses light wavelengths associated with yellow hues. In some implementations the color filter can be a green color filter that substantially suppresses light wavelengths associated with magenta hues.

In some implementations the respective indices of refraction of the at least two dielectric layers can be configured to provide a plurality of reductions in the index of refraction from the partial reflector to the substrate thereby increasing the color saturation of light reflected by the device. In some implementations the respective indices of refraction of the at least two dielectric layers can be configured to provide at least three reductions in the index of refraction from the partial reflector to the substrate thereby increasing the color saturation of light reflected by the device. In some implementations the respective indices of refraction of the at least three dielectric layers can be configured to provide at least four reductions in the index of refraction from the partial reflector to the substrate thereby increasing the color saturation of light reflected by the device.

Another innovative aspect of the subject matter described in this disclosure can be implemented in a device for modulating light, the device comprising: a movable reflector; a partial reflector positioned at a first distance from said movable reflector; a substrate positioned at a fixed distance from said partial reflector, the substrate having an index of refraction different from the partial reflector; and a dielectric layer having an index of refraction between that of the partial reflector and the substrate and a thickness sufficient to produce an interference filtering effect that increases saturation of light reflected by the device, wherein metal layers are excluded from between the dielectric layer and the substrate.

Another innovative aspect of the subject matter described in this disclosure can be implemented in a display comprising a plurality of display elements, each of the display elements comprising: means for reflecting light, said reflecting means being movable; means for partially reflecting light, wherein said movable reflecting means and said partial reflecting means are configured to interferometrically modulate light; a substrate positioned at a fixed distance from said partial reflecting means, the substrate having an index of refraction different from the partial reflecting means, wherein there are no metal layers between the substrate and the partial reflecting means; and means for matching refractive indices of the partial reflecting means and the substrate, wherein the refractive index matching means provides a reduction in the index of refraction from the partial reflecting means to the substrate thereby increasing the saturation of a particular color of light reflected by the device.

In some implementations the moveable reflecting means can comprise a reflective layer; or the partial reflecting means comprises a partially reflective material; or the refractive index matching means comprises a dielectric layer, the dielectric layer configured to provide a refractive index gradient between the partial reflector and the substrate, and wherein the dielectric layer is also configured as a color filter having a thickness sufficient to produce an interference effect that increases saturation of light reflected by the device.

Another innovative aspect of the subject matter described in this disclosure can be implemented in a method of making a device for modulating light, the method comprising: forming a movable reflector; forming a partial reflector positioned at a first distance from said movable reflector; providing a substrate positioned at a fixed distance from said partial reflector, the substrate having an index of refraction different from the partial reflector; and forming a dielectric layer configured to provide a refractive index gradient between the partial reflector and the substrate, and wherein the dielectric layer is also configured as a color filter having a thickness sufficient to produce an interference effect that increases saturation of light reflected by the device.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
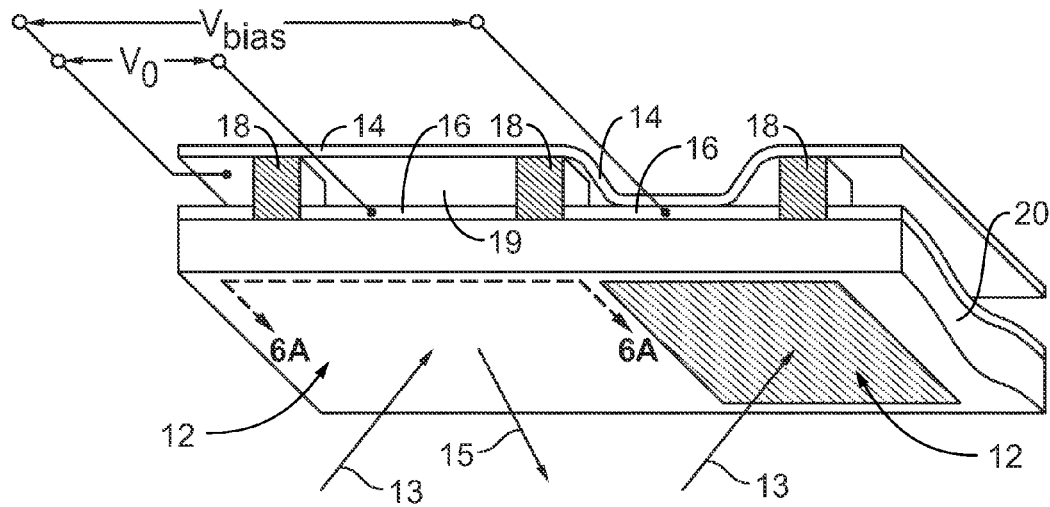
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

Various implementations include an interferometric modulator device configured to provide improved saturation. With the addition of a color filter layer, the color saturation of an interferometric modulator is improved. In particular, increased saturation and filtering is provided by optically matching the impedance of two materials in the interference modulator using a multilayer having layers with different refractive indices arranged to yield a refractive index gradient. In various implementations the thickness one or more of the layers are selected to provide increased saturation. Accordingly, in various embodiments the multilayer having a refractive index gradient narrows the resonance of a pixel such that the band of wavelengths that are reflected from the pixel is smaller. In turn, a device including a combination of red, green and blue pixels may expand the spectrum of colors that are reflected by the device in operation. Additionally, there may be better contrast between whites and blacks, with the black appearing more true black and containing less of a hue.

Particular implementations of the subject matter described in this disclosure can be implemented to realize one or more of the following potential advantages. For example, particular implementations of the subject matter described herein can be implemented to realize improved color saturation of one or more colors reflected by a display.

One example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
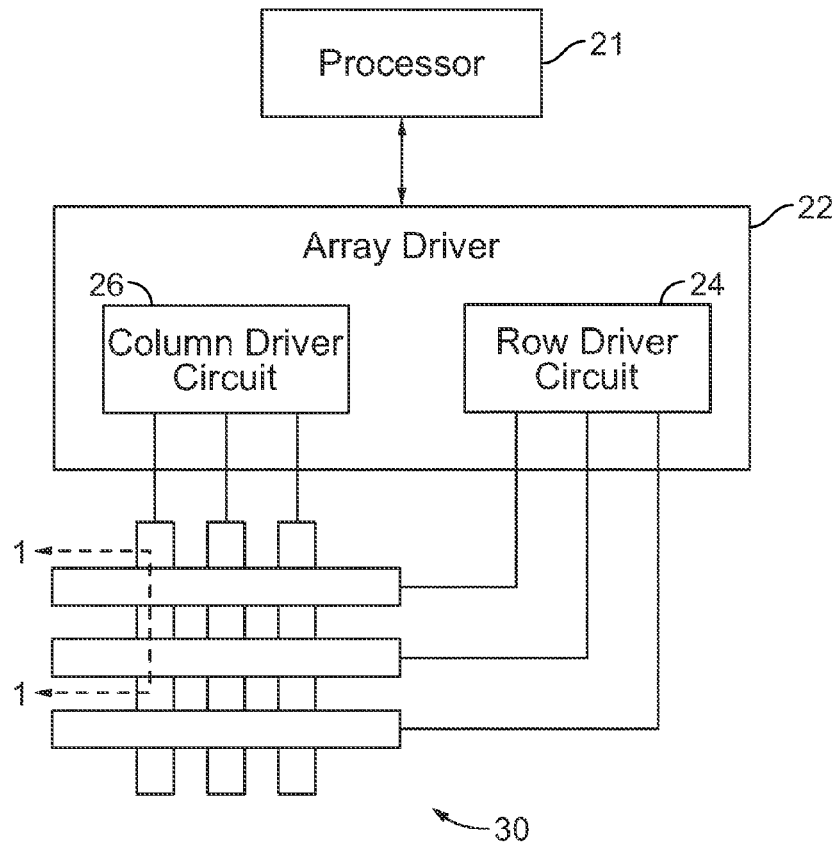
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
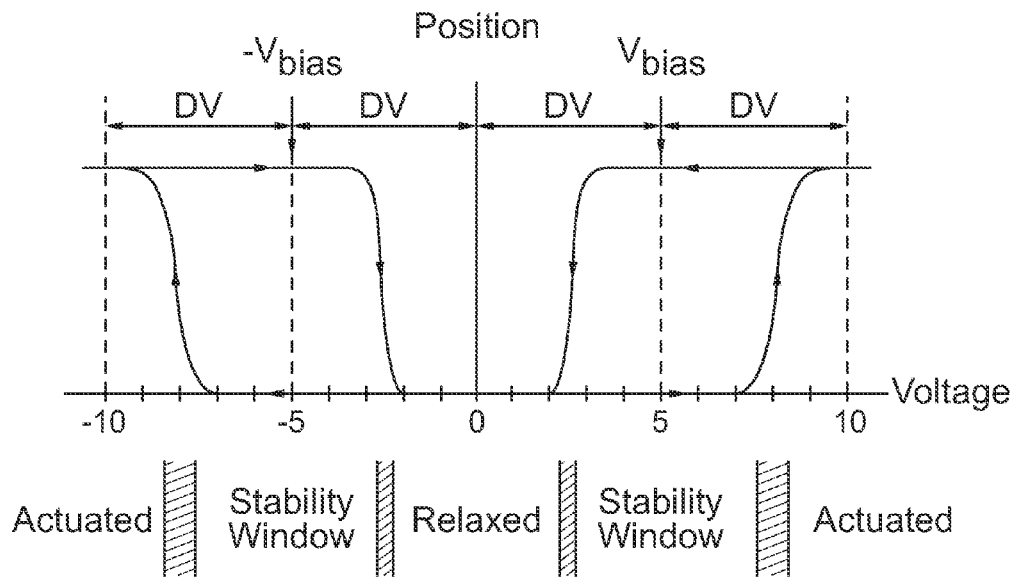
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
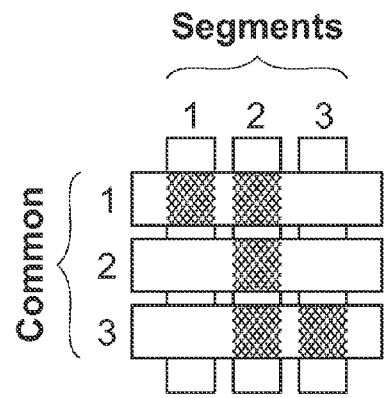
FIG. 5A shows an example of a diagram illustrating a frame of display data in the 3×3 interferometric modulator display of FIG. 2.
Figure 5B:
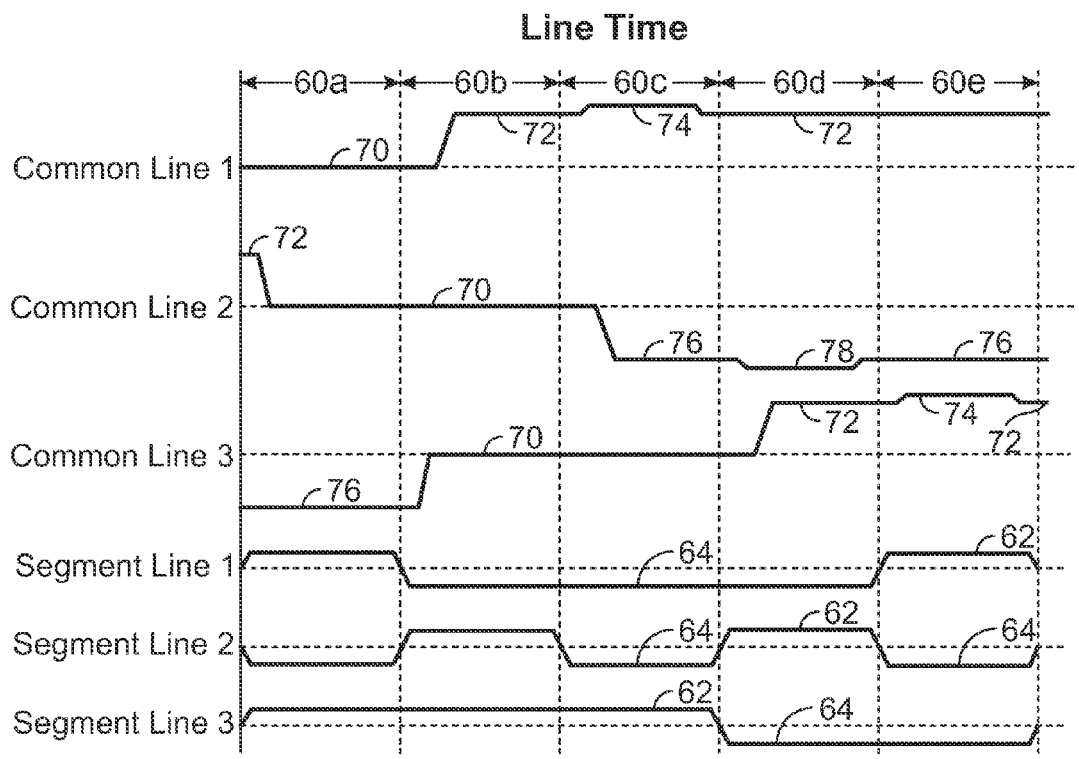
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position.

Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
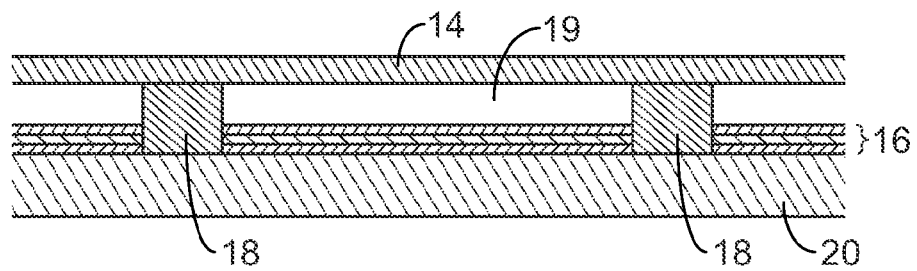
FIG. 6A shows an example of a partial cross-section of the interferometric modulator display of FIG. 1.
Figure 6B:
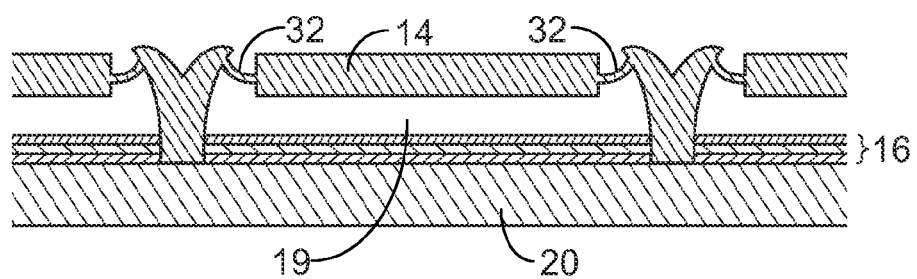
FIGS. 6B-6E show examples of cross-sections of varying implementations of interferometric modulators.
Figure 6C:
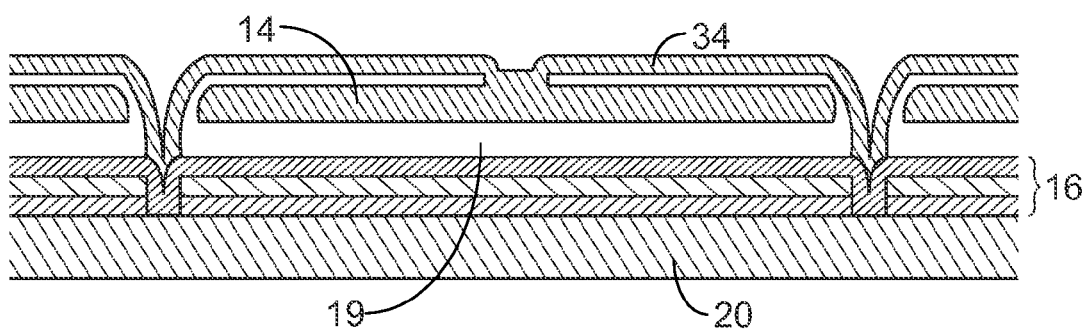

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
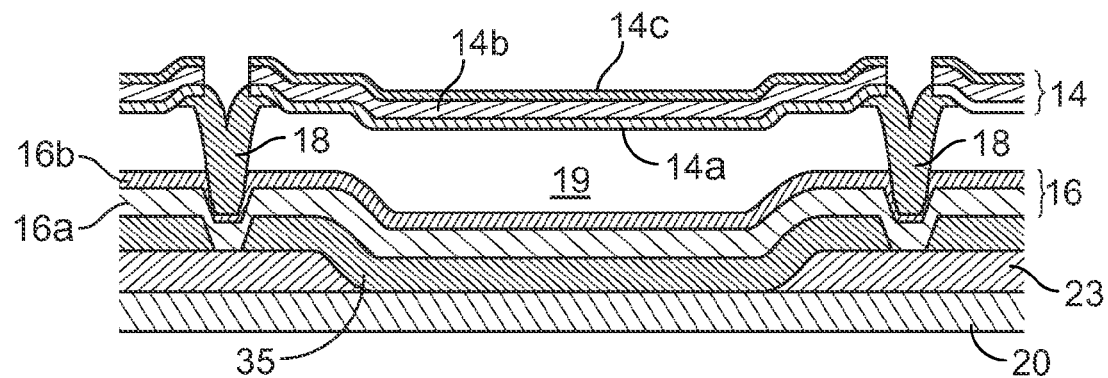

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2/SiON/SiO_2$ tri-layer stack. Either or both of the reflective sub-layer 14a and the conductive layer 14c can include, e.g., an Al alloy with about 0.5% Cu, or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, $CF_4$ and/or $O_2$ for the MoCr and $SiO_2$ layers and $Cl_2$ and/or $BCl_3$ for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
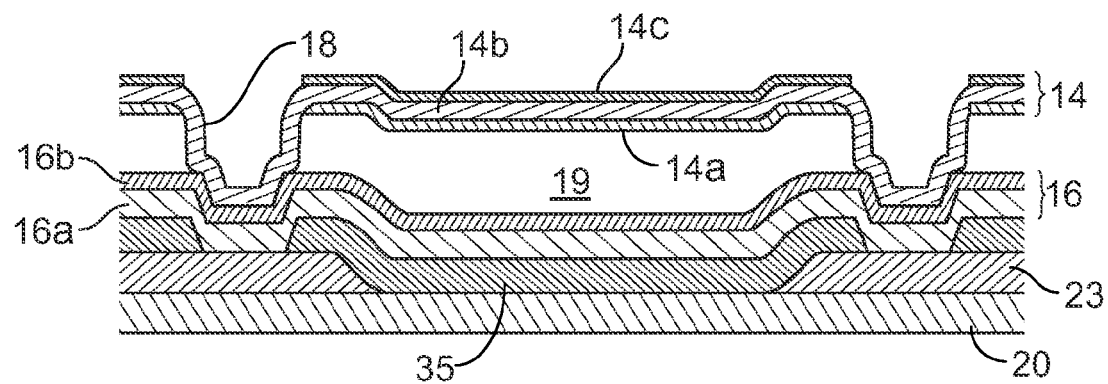

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
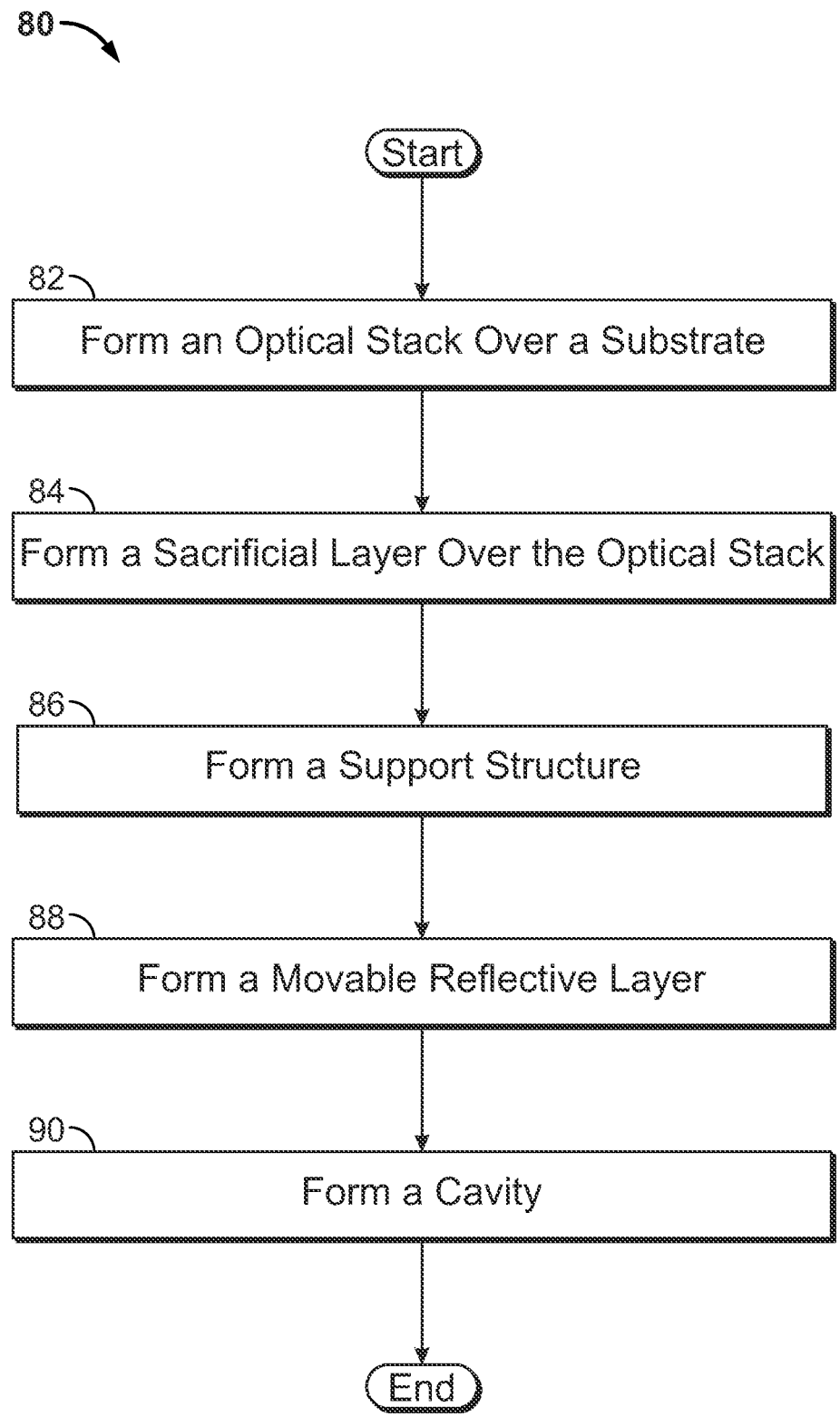
FIG. 7 shows an example of a flow diagram illustrating a manufacturing process for an interferometric modulator.
Figure 8A:
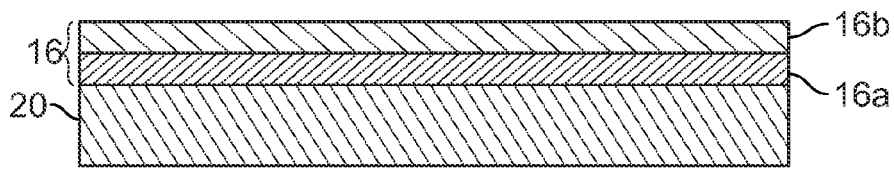
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
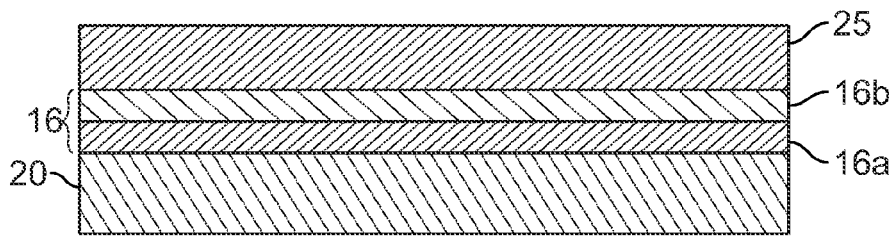

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
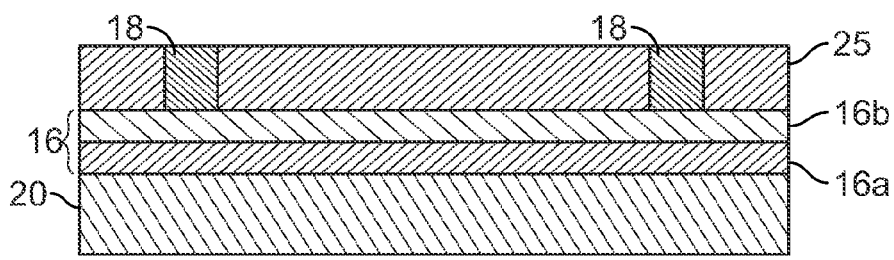

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
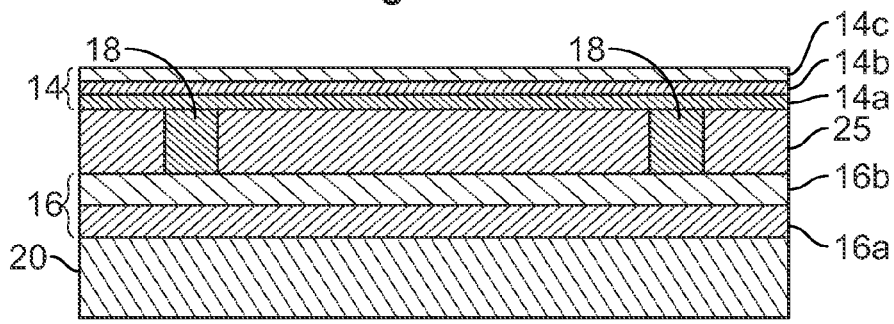
Figure 8E:
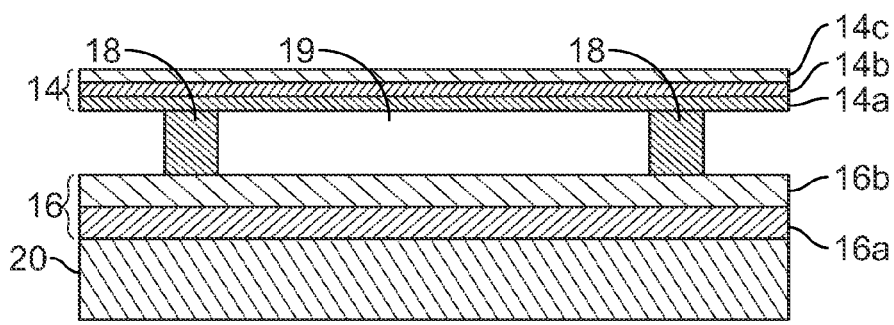

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Generally, modulators 12 reflect light that has one or more spectral peaks when wavelength is plotted versus intensity. The perceived color of light produced by a modulator 12 depends on the number, location, and spectral width of these peaks of the modulator 12 within the visible spectrum. The width of such peaks may be characterized by the width of the peak at the half maximum of intensity of reflected light, e.g., the full width at half maximum. Generally, modulators 12 that reflect light over a narrower range of wavelengths, e.g., have a narrower peak or higher "Q" value, produce colored light that is more saturated. As discussed in greater detail below, saturation refers to the dominance of hue in the color as indicated by the narrowness of the range of wavelengths of light output. A highly saturated hue has a vivid, intense color, while a less saturated hue appears more muted and grey. For example, a laser, which produces a very narrow range of wavelengths, produces highly saturated light. Conversely, a typical incandescent light bulb produces white light that may have a desaturated red or blue color. The saturation of the modulators 12 that comprise a color pixel affects properties of a display such as the color gamut and white point of the display.

An exemplary color display includes red, green, and blue display elements. Other colors are produced in such a display by varying the relative intensity of light produced by the red, green, and blue elements. Such mixtures of primary colors such as red, green, and blue are perceived by the human eye as other colors. The relative values of red, green, and blue in such a color system may be referred to as tristimulus values in reference to the stimulation of red, green, and blue light sensitive portions of the human eye. The range of colors that can be produced by a particular display may be referred to as the color gamut of the display. In general, increasing the saturation of the primary colors increases the color gamut, or range of colors that can be produced by the display. As described below with reference to FIG. 10, an embodiment of a display has a relatively larger color gamut as compared to some other displays because the saturation of at least one of the primary colors is substantially increased. While an exemplary color system based on red, green, and blue are disclosed herein, in other embodiments, the display may include modulators 12 having sets of colors that define other color systems in terms of sets of colors other than red, green, and blue.

In some embodiments, a trade off exists between producing light that appears bright and producing saturated colors (and increasing the color gamut of the display). Generally, given the same relative intensity levels, an output spectral peak of a light modulator that is broad or wide will appear brighter than one that is narrow because more light energy is reflected. However, while the broader spectrum will appear brighter, it will also be less saturated, e.g., appear pastel in color because the reflected light energy is spread across a broader spectrum.

In designing a display using interferometric modulators 12, the modulators 12 may be formed so as to increase the color saturation of reflected light. In one embodiment described herein, the saturation of light output by a display that includes the interferometric modulator 12 is increased using a color filter. In particular, such a display may include a color filter that is configured to cause the interferometric modulator to output light having a wavelength response peak that is narrower than the visible light wavelength response peak of the modulator 12 without the color filter. In various embodiments, this filter is an interference filter. This filter may be formed by adding a dielectric layer to the interferometric modulator. As described herein, in certain embodiments, an interferometric modulator is provided with a multilayer having layers with different refractive indices arranged to yield a refractive index gradient. The multilayer is included in the interferometric modulator so as to optically match the impedance of two materials in the interference modulator. The multilayer may include one or more color filter layers. In some embodiments, for example, a plurality of layers and possibly each layer in the multilayer contributes to increasing color saturation.

Accordingly, in various embodiments, a single layer is configured as a color filter that increases saturation. In one embodiment, the single layer is configured to improve saturation by forming the color filter layer. For example, the layer comprises a dielectric layer having a thickness tuned to provide a narrow spectral transmission band. The layer operates as an interference filter with reflective surfaces formed at the top and bottom (rear and front) of the dielectric layer are separated by a distance so as to provide optical interference and a resultant transmission spectrum with a narrow spectral band. The dielectric layer through such an interferometric effect operates as a color filter layer. The dielectric layer may have an index of refraction that is between that of adjacent layers so as to provide a gradient in refractive index. As described above, the dielectric layer having a refractive index gradient narrows the resonance of a pixel such that the band of wavelengths that are reflected from the pixel is smaller.

In various embodiments, additional layers, for example, additional dielectric layers, are included. These layers may establish a gradient in refractive index. One or more (possibly all) of these layers may also have a thickness that provides for color filtering and/or increased saturation. The additional layers may in some embodiments provide increased saturation. Such a designed is discussed in more detail with regard to FIG. 10.

Figure 9:
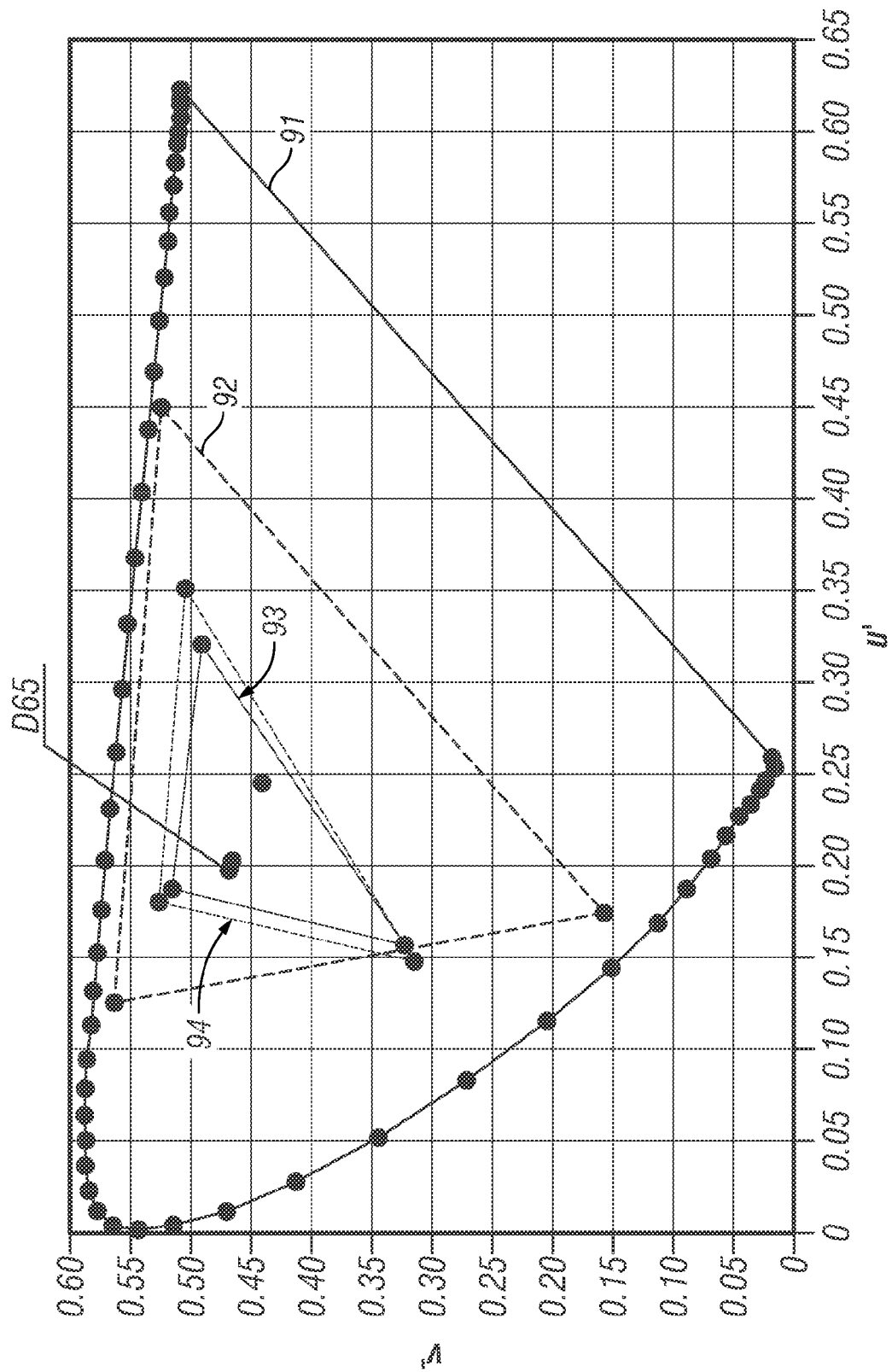
FIG. 9 is a chromaticity diagram that illustrates an example of an expanded color gamut provided by one implementation of a display that includes an interferometric modulator in combination with a multilayer having a refractive index gradient.

FIG. 9 is a chromaticity diagram that illustrates an example of an expanded color gamut provided by an embodiment of a display that includes an interferometric modulator with a multilayer having a refractive index gradient. As discussed above, the multilayer having a refractive index gradient may be configured to provide color filtering and to provide refractive index matching between a reflector and the transparent substrate of the interferometric modulator.

Using various color models, color is often described using three dimensions: hue, saturation, and lightness-darkness. The CIE defines color in three dimensions according to a color model known as the CIE 1976 (L*, u*, v*) color space (also referred to as the CIELUV color space). The model was originally developed based on the tristimulus theory of color perception, which is based on the scientific understanding that human eyes contain three different types of color receptors called cones. These three receptors respond differently to different wavelengths of visible light.

Hue is often described with the words that are commonly used to describe color: red, orange, yellow, green, blue, purple, etc. Under color models, such as the CIELUV color space, hue is more specifically described as the dominant wavelength of light perceived by the human eye. Saturation refers to the dominance or purity of a hue in a particular color relative to other colors. In terms of a spectral definition of color, saturation is the ratio of the dominant light wavelength to other wavelengths in the color. For example saturated red light contains less light energy from others colors than less saturated red light, but the less saturated red may appear brighter. White light is white because it contains an even balance of all wavelengths. How light or dark a color appears is referred to as value or brightness. In terms of a spectral definition of color using the CIELUV color space, value describes the overall intensity or strength of the light. As noted above, brighter colors tend to be muted or pastel colors because bright colors tend to have a broader spectrum that very saturated colors.

Chromaticity is understood by those skilled in the art to be one possible objective specification of the quality of a particular color irrespective of luminance, as determined by the hue and saturation (or excitation purity). The chromaticity diagram of FIG. 9 is defined by a pair of chromaticity dimensions or coordinates (u*,v*), leaving out the luminance dimension, L*, defining the CIELUV color space. The chromaticity dimensions (u*,v*) of the CIELUV color space allow the saturation of colored light to be considered in a two-dimensional space, which is easier to represent and interpret graphically than higher order spaces.

Those skilled in the art will appreciate that characterizing color using the terms hue, saturation and lightness-darkness does not limit the scope of the appended claims, but rather these terms merely serve to provide useful descriptions of colors. An embodiment of an interferometric modulator-based display can be characterized for the purposes of measurement and testing using any suitable color model or system, and that the CIELUV color space is merely described herein as one of many possible color models that may be employed to characterize an embodiment of an interferometric modulator-based display.

In FIG. 9, trace 91 defines the approximate boundary of the color gamut provided by the CIELUV color space. In other words, the trace 91 defines the approximate boundary of colors perceptible by human eyes according to the definition of the CIELUV color space. Trace 92 defines the approximate boundary of the color gamut provided by the sRGB color space. In other words, the trace 92 defines the approximate boundary of colors perceptible by human eyes that can be reproduced under the sRGB color space by electronics, such as, monitors, printers, projectors, etc. The simulated point D65, as defined by the CIE and discussed above, is the simulated standard white point corresponding roughly to a midday sun in Northwestern Europe. Generally, the CIE specifies that D65 is preferably used in all colorimetric calculations requiring representative daylight, unless there are specific reasons for using a different illuminant. Variations in the relative spectral power distribution of daylight are known to occur, particularly in the ultraviolet spectral region, as a function of season, time of day, and geographic location. Those skilled in the art will also appreciate that there are no actual D65 light sources, only simulators. The traces 91, 92 and the point D65 are useful references for evaluating the performance of displays and the like.

Trace 94 is a test result which defines the approximate boundary of the color gamut that can be reflected by an embodiment of a display including display elements, which include an interferometric modulator with a multilayer having a refractive index gradient. Again, as noted above, the multilayer having a refractive index gradient is configured to provide refractive index matching between a reflector and a transparent substrate of the interferometric modulator and to provide color filtering. By contrast, trace 93 is a trace that defines the approximate boundary of the color gamut of a display that employs similar interferometric modulators that do not include the multilayer having a refractive index gradient between the reflector and a transparent substrate of the interferometric modulator. The area enclosed by the trace 93 is smaller than the area enclosed by the trace 94, which means that the color gamut defined by the trace 94 is larger than the trace 93. The larger color gamut is the result of increasing the color saturation of red, blue and green, which, with reference to the chromaticity diagram of FIG. 9, is represented by the larger enclosed area defined by trace 94. Those skilled in the art will appreciate that increasing the saturation of any one or more of red, blue, and green will increase the color gamut. As such, the color gamut of a display can be increased by merely increasing the color saturation of just one of red, blue and green. In some embodiments, one of the red, blue or green subpixels of a display is provided with a multilayer having a refractive index gradient, which is configured to provide refractive index matching and color filtering. In other embodiments, one or more of the red, blue and green subpixels of a display is provided with a multilayer having a refractive index gradient, which is configured index matching and color filtering.

Figure 10:
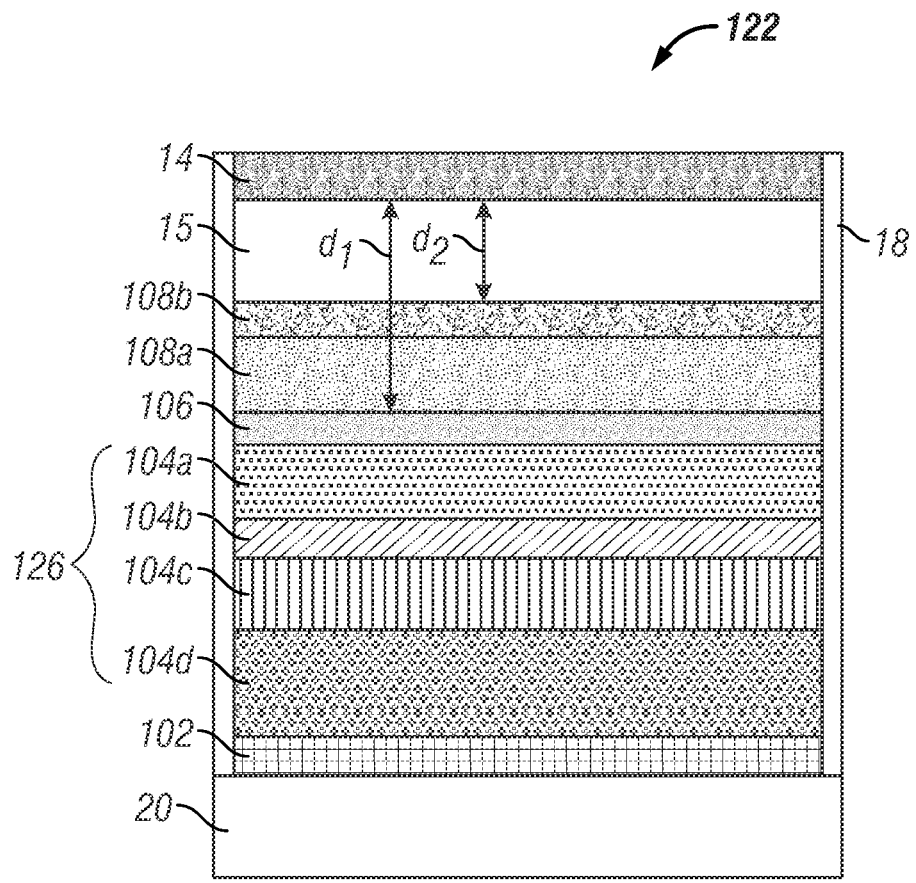
FIG. 10 is a side cross-sectional view of an implementation of an electromechanical systems device including an interferometric modulator and a multilayer having a refractive index gradient.

FIG. 10 is a side cross-sectional view of an embodiment of an interferometric modulator that includes a multilayer having a refractive index gradient formed on the transparent substrate 20.

In various embodiments, the interferometric modulator functions as a direct-view device, in which images are viewed from the front side of the transparent substrate 20, the side opposite to that upon which the interferometric modulator is arranged. The interferometric modulator includes a moveable reflective layer 14, a partially reflective layer 106, and dielectric layers 108a, 108b. In one embodiment, the dielectric layer 108a includes $SiO_2$. In one embodiment, the dielectric layer 108b includes AlOx. In one embodiment the reflective layer 14 includes AlCu. In one embodiment, the partially reflective layer 106 includes MoCr. In one embodiment, the reflective layer 14 is connected to the substrate 20 by the posts 18. Generally, the modulator 122 may include features according to any embodiment of the modulator 12 disclosed herein.

In some embodiments, the application of a voltage between the reflective layer 14 and the partially reflective layer 106 causes the reflective layer 14 to move toward the partially reflective layer 106. The dielectric layers 108a, 108b electrically isolate the reflective layer 14 from the partially reflective layer 106.

A multilayer 126 that provides a refractive index gradient is formed between the substrate 20 and the partially reflective layer 106. In various embodiments, the multilayer 126 having a refractive index gradient comprises a stack of layers including at least two dielectric layers. The respective indices of refraction of the at least two dielectric layers are configured to provide a gradual change in the index of refraction from the partial reflector 106 to the substrate 20 thereby increasing color saturation. In one embodiment, the respective indices of refraction of the at least two dielectric layers are configured to provide at least three reductions in the index of refraction from the partially reflector layer 106 to the substrate 20 thereby increasing the color saturation of light reflected by the device. That is, in such an embodiment, there is a first reduction in the index of refraction between the partially reflective layer 106 and a first one of the at least two dielectric layers. Additionally, there is a second reduction in the index of refraction between two of the at least two dielectric layers. And, there is a third reduction in the index of refraction between a second one of the at least two dielectric layers and the substrate 20.

In various embodiments, at least one dielectric layer included in the multilayer 126 is also configured as a color filter. As described above, for example, at least one dielectric layer (e.g., dielectric layer 104a) is configured as a color filter and has a thickness that provides optical interference from the top and bottom surfaces of the dielectric layer (e.g., layer 104a) so as to produce a transmission spectrum which provides color filtering. These top and bottom surfaces may be in contact with the layers above and below (e.g., partially reflective layer 106, dielectric layer 104b), respectively that may have different refractive indexes such that the interfaces between the layers (e.g., 106/104a and 104a/104b) form reflective surfaces via Fresnel reflection and index mismatch. Reflections from these surfaces can contribute to optical interference that affects spectral transmission. The space separating these interfaces is determined by the thickness of the dielectric layer (e.g., 104a) and can be such that the spectral transmission has a narrow transmission band or peak that provides color filtering. The dielectric layer can alter the transmission spectrum in other ways as well.

As described above, additional dielectric layers (e.g., 104b, 104c, 104d) may provide index matching. These additional dielectric layers (e.g., 104b, 104c, 104d) may also have suitable thickness so as to enhance the filtering effect and increase optical saturation as a result of optical interference. Any one of the layers (e.g., 104b, 104c, 104d) may have reflective interfaces formed by that layer and a layer directly above and a layer directly below. Interfaces between different layers of material with different refractive index produce Fresnel reflection that may cause optical interference. In various embodiments, the thickness of one or more of the layers is such that the optical interference results in color filtering and increased color saturation. In one embodiment, the respective indices of refraction of the three dielectric layers 104b, 104c, 104d are configured to provide at least four reductions in the index of refraction from the partially reflector layer 106 to the substrate 20 thereby increasing the color saturation of light reflected by the device. That is, in such an embodiment, there is a first reduction in the index of refraction between the partially reflective layer 106 and the dielectric layer 104b. Additionally, there is a second reduction in the index of refraction between the dielectric layers 104b, 104c. Additionally, there is a third reduction in the index of refraction between the dielectric layers 104c, 104d. And there is a fourth reduction in the index of refraction between the dielectric layer 104d and the substrate 20.

With reference to FIG. 10, the multilayer 126 having a refractive index gradient is an optical stack made up of the four layers 104a, 104b, 104c, 104d of material.

In one embodiment, the first layer 104a is configured to serve as a color filter. In one embodiment, the layer 104a is configured to serve as a red color filter that substantially suppresses light wavelengths associated with cyan hues. In one embodiment, the layer 104a that is configured to serve as a color filter is configured to serve as a blue color filter that substantially suppresses light wavelengths associated with yellow hues. In one embodiment, the color filter layer 104a is configured to serve as a green color filter that substantially suppresses light wavelengths associated with magenta hues.

In one embodiment, the second layer 104b is configured to serve as an etch stop layer, and includes a material less susceptible to etchants (e.g. AlOx) that might otherwise go through the layer beneath the second layer 104b when etching the layer 104a on top of the second layer 104b. In one embodiment, the third layer 104c includes SiO$_2$. In one embodiment, the fourth layer 104d is configured to serve as an etch stop layer, and includes a material less susceptible to etchants (e.g. AlOx) that might otherwise go through the material beneath the fourth layer 104d when etching the layer 104c (e.g., SiO$_2$) on top of the fourth layer 104d.

The dielectric layers 104a, 104b, 104c, 104d are configured to produce a refractive index gradient between the partially reflective layer 106 and the substrate 20. Providing such a gradient between the partially reflective layer and the substrate 20 can also be described as a form of optical impedance matching. More specifically, in one embodiment: the first partially reflective layer 106 (MoCr) has a refractive index of approximately 3.0-4.0; the first dielectric layer 104a (e.g. the color filter) is configured to have a refractive index of approximately 1.9-2.6; the second dielectric layer 104b is configured to have a refractive index of approximately 1.7; the third dielectric layer 104c is configured to have a refractive index of approximately 1.5; the fourth dielectric layer 104d is configured to have a refractive index of approximately 1.7; and the substrate 20 is configured to have a refractive index of approximately 1.4-1.6.

As described above, the thickness of one or more, possibly all, of these layers 104a, 104b, 104c, 104d, may be selected to provide color filtering and increased saturation via optical interference effects. Accordingly, the presence of any of these layers may increase the color saturation of the resultant modulator in comparison to an identical modulator without the layer (or layers). In some embodiments, the presence of any of these dielectric layers (e.g., 104a, 104b, 104c, 104d) may even increase the color saturation of the resultant modulator in comparison to a modulator with the same layer (or layers) removed but having the thickness(es) of the remaining layers in the modulator adjusted to optimize saturation.

Accordingly, various embodiments, such as the embodiment shown in FIG. 10 may provide a more saturated red interferometric modulator. Similar approaches may be used to form different color interferometric modulators. For example, a green interferometric modulator having increase saturation may be produced using the same, similar, or different materials. Other color interferometric modulators having improved saturation may also be produced.

In various embodiments, the multilayer index gradient provides for at least one reduction in refractive index from the partial reflector to a first layer in the multilayer that is under the partial reflector, at least one reduction in refractive index from the first layer in the multilayer to a second layer in the multilayer that is under the first layer, and at least one reduction from the second layer in the multilayer to the substrate that is under the second layer. In some embodiments, additional reductions are included. For example, a third layer may be included in the multilayer under the second layer. This third layer may provide a reduction in refractive index with respect to the second layer. The index of the third layer may be such that the substrate, which is located under the third layer, has a lower refractive index than the third layer. Other embodiments are possible.

In some embodiments the multilayer itself has layers that provide the multilayer with a gradient in refractive index.

In some embodiments, layers may be included that deviate from the trend of the gradient provided by the multilayer. For example, although the multilayer may include a plurality of layers with progressively decreasing index of refraction, one or more layers may be introduced between layers in the multilayer which result in an increase of index of refraction from one layer to the next. In some embodiments, however, the overall gradient may still be maintained. For example, the multilayer index gradient may provide for at least one reduction in refractive index from the partial reflector to a first layer in the multilayer that is under the partial reflector, at least one reduction in refractive index from the first layer in the multilayer to a second layer in the multilayer that is under the first layer, and at least one reduction from the second layer in the multilayer to a third layer in the multilayer that is under the second layer but an increase in refractive index from the third layer in the multilayer to the substrate that is under the third layer, however, with the index of the substrate being lower than the index of the second layer.

In some embodiments, one or more layers may be included in the multilayer that deviate from the trend of the refractive index gradient within the multilayer. Other designs are possible.

Nevertheless, in various embodiments, optically matching the impedance of two materials with substantially different respective refractive indices with a refractive index gradient comprising a plurality of layers of material arranged to provide a gradient index substantially improves the saturation of the interferometric modulator. The optical impedance matching helps to improve saturation by narrowing the resonance of a pixel such that the band of wavelengths that are reflected from the pixel is smaller. The resonance of a pixel may be narrowed by specifically configuring the refractive index of each of one or more dielectric layers 104*b*, 104*c*, 104*d* below the first dielectric layer 104*a*. The refractive index of each particular dielectric layer 104*a*, 104*b*, 104*c*, 104*d* can be adjusted by, for example, the chemistry of each layer.

As also described above, any one or more of the dielectric layers 104*a*, 104*b*, 104*c*, 104*d* can have a thickness suitable to provide through interference effects increased saturation.

Although the topmost layer (e.g., layer 104*a*) in the multilayer is referred to as a color filter, any one or more of the other layers may be characterized as a color filter in various embodiments.

In various embodiments, including a plurality of different color interferometric modulators, a combination of red, green and blue display elements may expand the spectrum of colors that are reflected by the display in operation. Additionally, by providing index matching, an index gradient, and/or one or more color filters (e.g., by adjusting the thickness of layers) such as described herein, there may be better contrast between whites and blacks, as the black state produced by the interferometric modulator may be darker with less hue. A blacker back, which may be produced by using embodiments described herein, provides for more desirable images as well as better contrast.

A wide variety of variations are possible. For example, although four dielectric layers are described above in the multilayer, more or less dielectric layers may be used. Additionally, other materials may be used. Another type of material that may be used is SiON. Materials other than those specifically recited herein may also be used.

Additionally, in one embodiment, instead of using a multilayer, a single layer (e.g. 104*a*) that is configured as a color filter may have a thickness that provides an interferometric filtering effect that improves saturation. The thickness of the single layer may be such that Fresnel reflections from the top and bottom of the single layer produce optical interference and yield a transmission spectrum that provides color filtering. Accordingly, the single dielectric layer having a thickness sufficient to create an interferometric filtering effect as a result of an optical resonant cavity as defined by the boundaries of the dielectric layer adjacent to other materials, may improve saturation. In one embodiment, the thickness is sufficient to create an effect similar to or substantially identical to an interference filter. The single layer may also provide index matching. The single dielectric layer may, for example, have an index of refraction between the index of refraction of that layer directly above (e.g., partially reflective layer) and the layer (e.g. substrate) directly below the single dielectric layer.

In various embodiments, no metal layers are included between the single dielectric layer and the substrate. Similarly, if a multilayer dielectric is used, the multilayer does not include any metal layers in various embodiments. No metal layers are also included between the multilayer and the substrate in various embodiments. Likewise, in various embodiments, no metal layers are included between the dielectric layer or layers and the substrate.

The production of an interferometric modulator device incorporating a wavelength filter such as the dielectric layer or the multilayer having a refractive index gradient involves only a few additional process steps compared to the production of an interferometric modulator device without the dielectric layer or multilayer having a refractive index gradient. In the example illustrated in FIG. 10, incorporation of the multilayer having a refractive index gradient involves only the additional steps of depositing the dielectric layers 104*a*, 104*b*, 104*c*, 104*d*.

Figure 11A:
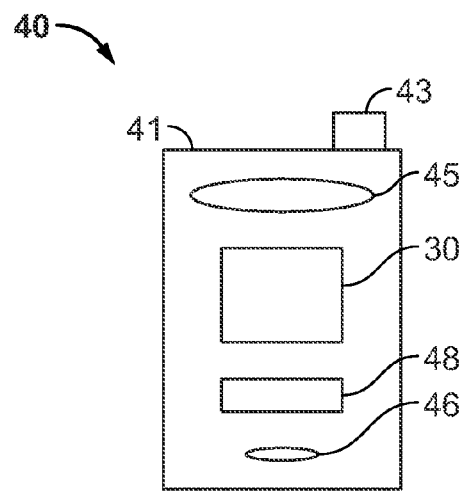
FIGS. 11A and 11B show examples of system block diagrams illustrating a display device that includes a plurality of interferometric modulators.
Figure 11B:
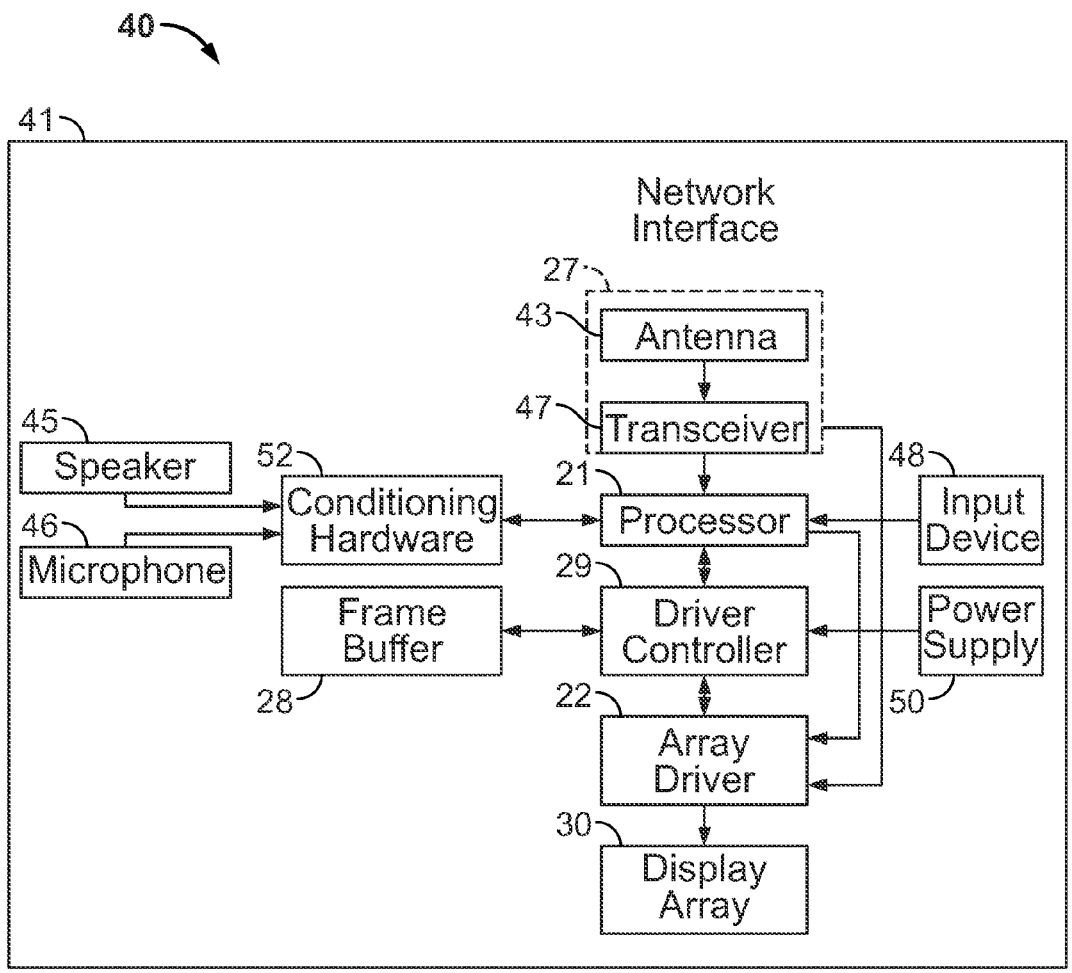

FIGS. 11A and 11B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 11B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a standalone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A device for modulating light, the device comprising:
   a movable reflector;
   a partial reflector positioned at a first distance from the movable reflector;
   a substrate positioned at a fixed distance from the partial reflector, the substrate having an index of refraction different from the partial reflector; and
   a multilayer configured to provide a refractive index gradient between the partial reflector and the substrate, the multilayer including at least two dielectric layers, wherein the respective indices of refraction of the at least two dielectric layers are configured to provide a reduction in the index of refraction from the partial reflector to the substrate thereby increasing the color saturation of light reflected by the device.

2. The device of claim 1, wherein the index of refraction of the partial reflector is greater than the index of refraction of the substrate.

3. The device of claim 1, wherein at least one dielectric layer included in the multilayer forms a color filter.

4. The device of claim 3, wherein the color filter is a red color filter that substantially suppresses light wavelengths associated with cyan hues.

5. The device of claim 3, wherein the color filter is a blue color filter that substantially suppresses light wavelengths associated with yellow hues.

6. The device of claim 3, wherein the color filter is a green color filter that substantially suppresses light wavelengths associated with magenta hues.

7. The device of claim 1, further comprising a dielectric layer between the movable reflector and the partial reflector.

8. The device of claim 1, wherein the substrate includes glass.

9. The device of claim 1, wherein at least one of the dielectric layers in the multilayer includes aluminum oxide.

10. The device of claim 1, wherein at least one of the dielectric layers in the multilayer includes silicon dioxide.

11. The device of claim 1, wherein the device forms part of a display.

12. The device of claim 11, further comprising:
    a processor that is in electrical communication with the display, the processor being configured to process image data; and
    a memory device in electrical communication with the processor.

13. The device of claim 12, further comprising a driver circuit configured to send at least one signal to the display.

14. The device of claim 13, further comprising a controller configured to send at least a portion of the image data to the driver circuit.

15. The device of claim 14, further comprising an image source module configured to send the image data to the processor.

16. The device of claim 15, wherein the image source module includes at least one of a receiver, transmitter, or transceiver.

17. The device of claim 12, further comprising an input device configured to receive input data and to communicate the input data to the processor.

18. The device of claim 1, wherein the respective indices of refraction of the at least two dielectric layers are configured to provide a plurality of reductions in the index of refraction from the partial reflector to the substrate thereby increasing the color saturation of light reflected by the device.

19. The device of claim 1, wherein the respective indices of refraction of the at least two dielectric layers are configured to provide at least three reductions in the index of refraction from the partial reflector to the substrate thereby increasing the color saturation of light reflected by the device.

20. The device of claim 1, wherein the respective indices of refraction of at least three dielectric layers in the multilayer are configured to provide at least four reductions in the index of refraction from the partial reflector to the substrate thereby increasing the color saturation of light reflected by the device.

21. The device of claim 1, wherein metal layers are excluded from the multilayer and from between the multilayer and the substrate.

22. A device for modulating light, the device comprising:
a movable reflector;
a partial reflector positioned at a first distance from the movable reflector;
a substrate positioned at a fixed distance from the partial reflector, the substrate having an index of refraction different from the partial reflector; and
a dielectric layer having an index of refraction between that of the partial reflector and the substrate and a thickness sufficient to produce an interference filtering effect that increases saturation of light reflected by the device,
wherein metal layers are excluded from between the dielectric layer and the substrate.

23. The device of claim 22, wherein the index of refraction of the partial reflector is larger than the index of refraction of the substrate.

24. The device of claim 22, wherein the presence of the dielectric layer suppresses light wavelengths associated with cyan hues and selectively transmits wavelengths associated with red hues thereby providing red color filtering.

25. The device of claim 22, wherein the presence of the dielectric layer suppresses light wavelengths associated with yellow hues and selectively transmits wavelengths associated with blue hues thereby providing blue color filtering.

26. The device of claim 22, wherein the presence of the dielectric layer suppresses light wavelengths associated with magenta hues and selectively transmits wavelengths associated with green hues thereby providing green color filtering.

27. The device of claim 22, further comprising a second dielectric layer between the movable reflector and the partial reflector.

28. The device of claim 22, wherein the substrate includes glass.

29. A device for modulating light, the device comprising:
means for reflecting, the reflecting means being movable;
means for partially reflecting positioned at a first distance from the movable reflecting means;
means for supporting positioned at a fixed distance from the partially reflecting means, the supporting means having an index of refraction different from the partially reflecting means; and
means for providing a refractive index gradient between the partially reflecting means and the supporting means, the refractive index gradient providing means including at least two means for insulating, wherein the respective indices of refraction of the at least two insulating means are configured to provide a reduction in the index of refraction from the partially reflecting means to the supporting mean thereby increasing the color saturation of light reflected by the device.

30. The device of claim 29, wherein:
the movable reflecting means includes a movable reflector; or
the partially reflecting means includes a partial reflector; or
the supporting means includes a substrate; or
the refractive index gradient providing means includes a multilayer; or
the two insulating means include at least two dielectric layers.

31. The device of claim 29, wherein the supporting means includes a means for supporting during fabrication of the device.

32. The device of claim 31, wherein the means for supporting during fabrication of the device includes a substrate.

33. A device for modulating light, the device comprising:
means for reflecting, the reflecting means being movable;
means for partially reflecting, the partially reflecting means being positioned at a first distance from the movable reflecting means;
a supporting means positioned at a fixed distance from the partially reflecting means, the supporting means having an index of refraction different from the partially reflecting means; and
means for insulating having an index of refraction between that of the partially reflecting means and the supporting means and a thickness sufficient to produce an interference filtering effect that increases saturation of light reflected by the device,
wherein metal layers are excluded from between the insulating means and the supporting means.

34. The device of claim 33, wherein:
the movable reflecting means includes a movable reflector; or
the partially reflecting means includes a partial reflector; or
the supporting means includes a substrate; or
the insulating means includes a dielectric layer.

35. The device of claim 33, wherein the supporting means includes a means for supporting during fabrication of the device.

36. The device of claim 35, wherein the means for supporting during fabrication of the device includes a substrate.

37. A method of making a device for modulating light, the method comprising:
providing a movable reflector;
providing a partial reflector, the partial reflector positioned at a first distance from the movable reflector;
providing a substrate, the substrate positioned at a fixed distance from the partial reflector, the substrate having an index of refraction different from the partial reflector; and
including a multilayer configured to provide a refractive index gradient between the partial reflector and the substrate, the multilayer including at least two dielectric layers, wherein the respective indices of refraction of the at least two dielectric layers are configured to provide a reduction in the index of refraction from the partial reflector to the substrate thereby increasing the color saturation of light reflected by the device.

38. A method of making a device for modulating light, the method comprising:
providing a movable reflector;
providing a partial reflector, the partial reflector positioned at a first distance from the movable reflector;
providing a substrate, the substrate positioned at a fixed distance from the partial reflector, the substrate having an index of refraction different from the partial reflector; and
including a dielectric layer having an index of refraction between that of the partial reflector and the substrate and a thickness sufficient to produce an interference effect that increases saturation of light reflected by the device, wherein metal layers are excluded from between the dielectric layer and the substrate.

39. The method of claim 38, wherein the index of refraction of the partial reflector is larger than the index of refraction of the substrate.

40. The method of claim 38, wherein the dielectric layer is configured to serve as a red color filter that substantially suppresses light wavelengths including and around cyan hues.

41. The method of claim 38, wherein the dielectric layer is configured to serve as a blue color filter that substantially suppresses light wavelengths including and around yellow hues.

42. The method of claim 38, wherein the dielectric layer is configured to serve as a green color filter that substantially suppresses light wavelengths including and around magenta hues.

43. The method of claim 38, further comprising including a second dielectric layer between the movable reflector and the partial reflector.

44. The method of claim 38, wherein the substrate includes glass.

* * * * *